US012233560B2

(12) United States Patent
Ha et al.

(10) Patent No.: US 12,233,560 B2
(45) Date of Patent: Feb. 25, 2025

(54) AUTOMATED GAS SUPPLY SYSTEM

(71) Applicant: Samsung Electronics Co., Ltd., Suwon-si (KR)

(72) Inventors: Min Sung Ha, Seoul (KR); Kwang-Jun Kim, Ansan-si (KR); Jong Kyu Kim, Suwon-si (KR); Hyun-Joong Kim, Seongnam-si (KR); Jin Ho So, Seoul (KR); Chi-Gun An, Suwon-si (KR); Ki Moon Lee, Seoul (KR); Hui Gwan Lee, Suwon-si (KR); Beom Soo Hwang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/390,413

(22) Filed: Dec. 20, 2023

(65) Prior Publication Data
US 2024/0116184 A1 Apr. 11, 2024

Related U.S. Application Data

(62) Division of application No. 17/665,949, filed on Feb. 7, 2022, now Pat. No. 11,904,480.

(51) Int. Cl.
*B25J 9/16* (2006.01)
*B25J 5/02* (2006.01)
(Continued)

(52) U.S. Cl.
CPC .............. *B25J 9/1687* (2013.01); *B25J 5/02* (2013.01); *B25J 9/0093* (2013.01); *B25J 9/1682* (2013.01); *B25J 13/088* (2013.01)

(58) Field of Classification Search
CPC . B25J 5/02; B25J 9/0093; B25J 9/1682; B25J 9/1687; B25J 13/088
See application file for complete search history.

(56) References Cited

U.S. PATENT DOCUMENTS 9,324,053 B1   4/2016  Lavra et al.
9,430,732 B2 * 8/2016  Mats ................ G06K 19/07766
(Continued)

FOREIGN PATENT DOCUMENTS

JP   2000-081196 A    3/2000
JP   2000-352496 A   12/2000
(Continued)

OTHER PUBLICATIONS

Korean Notice of Allowance dated Jan. 2, 2023 issued in corresponding Korean Appln. No. 10-2020-0021453.

*Primary Examiner* — Saul Rodriguez
*Assistant Examiner* — Brendan P Tighe
(74) *Attorney, Agent, or Firm* — HARNESS, DICKEY & PIERCE, P.L.C.

(57) ABSTRACT

An automated gas supply system includes a gas cylinder transfer unit configured to transfer a cradle in which one or more gas cylinders storing a gas therein are stored; a gas cylinder inspection unit configured to check properties of the gas stored in the gas cylinder transferred from the gas cylinder transfer unit and check whether the gas leaks from the gas cylinder; a storage queue configured to receive the gas cylinder from the gas cylinder inspection unit by a mobile robot and configured to classify and store the transferred gas cylinders according to the properties of the gas stored in the gas cylinder; and a gas cabinet configured to receive the gas cylinder from the storage queue by the mobile robot and fasten a gas pipe, which is connected to a semiconductor manufacturing process line, to a gas spray nozzle, which is disposed at one side of the received gas cylinder, to supply the gas stored in the gas cylinder to the semiconductor manufacturing process line, wherein the gas cabinet includes a residual gas detector configured to detect a residual amount of the gas stored in the gas cylinder fastened to the gas pipe, and when the residual amount of the (Continued)

gas detected by the residual gas detector is less than or equal to a set residual amount of gas, the mobile robot recovers the gas cylinder from inside the gas cabinet and transfers a gas cylinder stored in the storage queue to the gas cabinet.

20 Claims, 23 Drawing Sheets

(51) Int. Cl.
    *B25J 9/00*           (2006.01)
    *B25J 13/08*         (2006.01)

(56) References Cited

U.S. PATENT DOCUMENTS

| | | | |
|---|---|---|---|
| 2018/0144297 A1* | 5/2018 | Kadayifcioglu | G06Q 10/0833 |
| 2021/0222834 A1* | 7/2021 | Choi | F17C 13/04 |
| 2022/0274780 A1* | 9/2022 | Byeon | B25J 19/023 |
| 2022/0403982 A1* | 12/2022 | Tilhof | F17C 5/007 |

FOREIGN PATENT DOCUMENTS

| | | |
|---|---|---|
| JP | 2002-506413 A | 2/2002 |
| KR | 0156988 | 10/1998 |
| KR | 100252935 B1 | 6/2000 |
| KR | 100303226 B1 | 11/2001 |
| KR | 100709576 B1 | 4/2007 |
| KR | 101009285 B1 | 1/2011 |
| KR | 101249345 B1 | 4/2013 |
| KR | 101259803 B1 | 4/2013 |
| KR | 101589678 B1 | 1/2016 |
| KR | 101720990 B1 | 4/2017 |
| KR | 101844060 B1 | 3/2018 |
| KR | 10-2018-0065005 A | 6/2018 |
| KR | 10-2019-0051408 A | 5/2019 |
| KR | 101980045 B1 | 5/2019 |
| KR | 10-2020-0091553 A | 7/2020 |
| KR | 102132170 B1 * | 7/2020 |
| KR | 10-2021-0014059 A | 2/2021 |
| WO | WO-9900755 A1 * | 1/1999 ............ F17C 13/003 |

* cited by examiner

460

423

AUTOMATED GAS SUPPLY SYSTEM

CROSS-REFERENCE TO RELATED APPLICATION

This U.S. non-provisional patent application is a divisional of U.S. application Ser. No. 17/665,949, filed on Feb. 7, 2022, the entire contents of which are incorporated by reference herein.

BACKGROUND

1. Field of the Disclosure

The present disclosure relates to an automated gas supply system.

2. Description of the Related Art

Processes of manufacturing semiconductors and displays use various gases such as a cleaning gas and an etching gas. The supply of gas necessary for the processes starts with transporting gas cylinders unloaded from a vehicle. In general, the gas cylinders are directly transported by a worker using a forklift or a cart and are supplied to each process element. Here, the weight of the gas cylinder varies according to the properties of a gas but is approximately 120 kg or more. Therefore, the musculoskeletal system of workers who repeatedly transport the gas cylinders, which are heavy objects, may be affected.

Also, the transported gas cylinders are usually stored in a cabinet, and in example embodiments where a gas cylinder needs to be replaced, a worker takes a gas cylinder out of the cabinet and fastens the gas cylinder to process equipment. Therefore, workers may be exposed to gas and may be at risk of gas accidents, explosions, or fire.

SUMMARY

Aspects of the present disclosure provide an automated gas supply system capable of, through automation of all processes from warehousing to shipping out of gas cylinders, preventing workers from being put at risk due to exposure to gas between a series of tasks.

It should be noted that objects of the present disclosure are not limited to the above-mentioned object, and other unmentioned objects of the present disclosure will be apparent to those skilled in the art from the following descriptions.

According to example embodiments of the present inventive concepts, an automated gas supply system includes a gas cylinder transfer unit configured to transfer a cradle in which one or more gas cylinders storing a gas therein are stored; a gas cylinder inspection unit configured to check properties of the gas stored in the gas cylinder transferred from the gas cylinder transfer unit and check whether the gas leaks from the gas cylinder; a storage queue configured to receive the gas cylinder from the gas cylinder inspection unit by a mobile robot and configured to classify and store the transferred gas cylinders according to the properties of the gas stored in the gas cylinder; and a gas cabinet configured to receive the gas cylinder from the storage queue by the mobile robot and fasten a gas pipe, which is connected to a semiconductor manufacturing process line, to a gas spray nozzle, which is disposed at one side of the received gas cylinder, to supply the gas stored in the gas cylinder to the semiconductor manufacturing process line, wherein the gas cabinet includes a residual gas detector configured to detect a residual amount of the gas stored in the gas cylinder fastened to the gas pipe, and when the residual amount of the gas detected by the residual gas detector is less than or equal to a set residual amount of gas, the mobile robot recovers the gas cylinder from inside the gas cabinet and transfers a gas cylinder stored in the storage queue to the gas cabinet.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF EXAMPLE EMBODIMENTS

Hereinafter, an automated gas supply system according to some example embodiments of the present disclosure will be described with reference to FIGS. 1 to 23.

Figure 1:
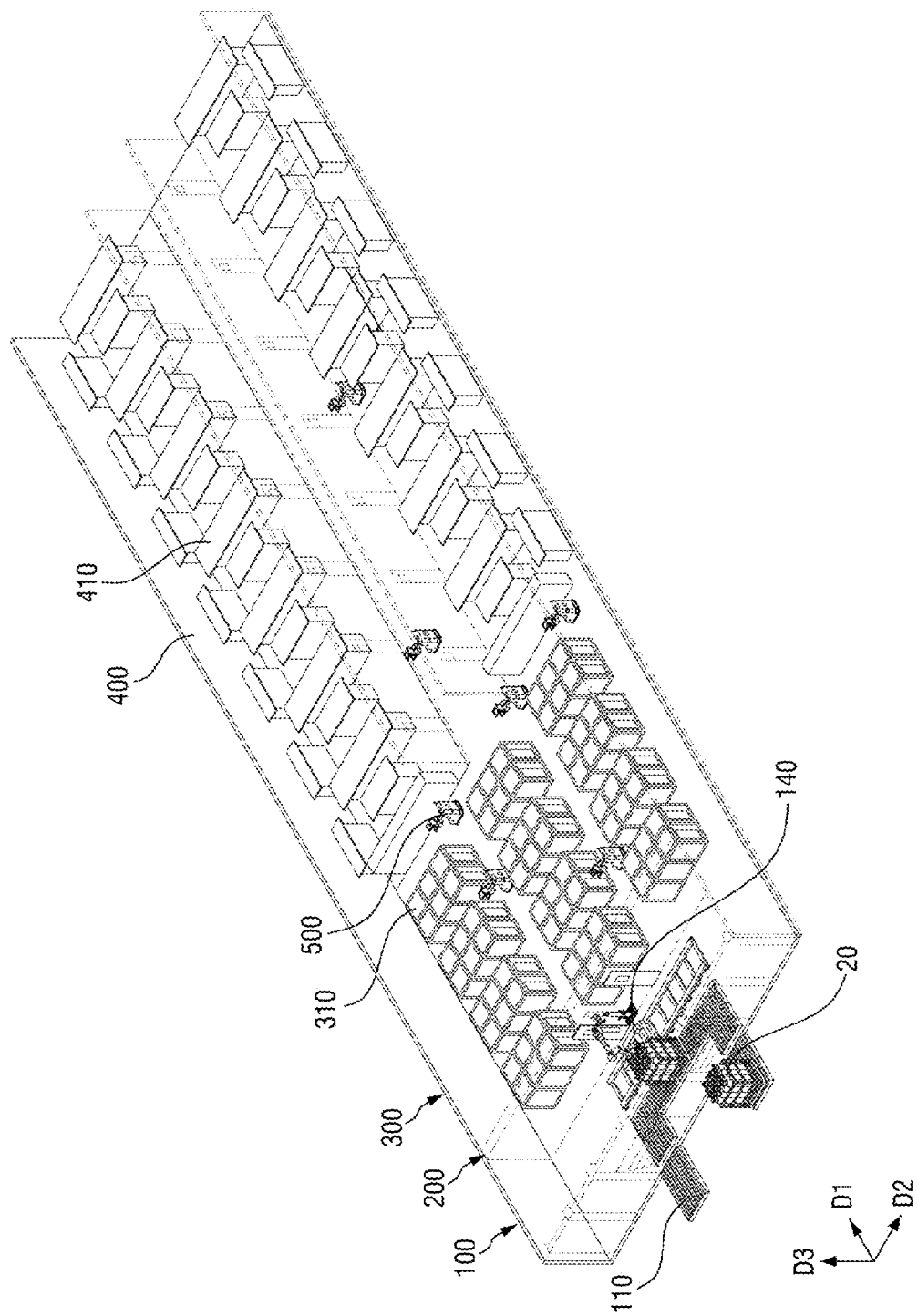
FIG. 1 is a view for describing an automated gas supply system according to some example embodiments of the present disclosure.
Figure 2:
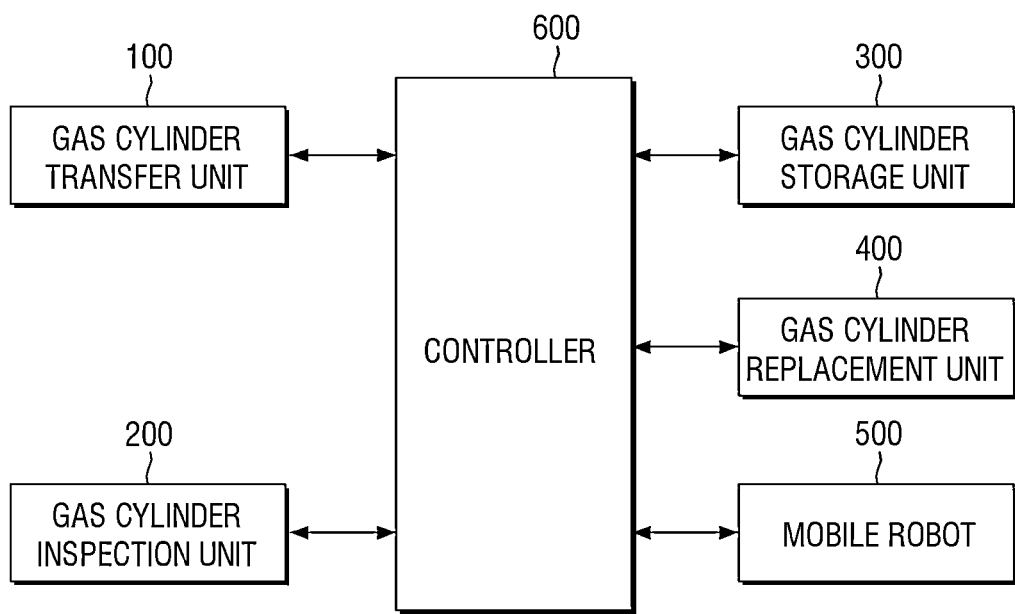
FIG. 2 is a view for describing the automated gas supply system according to some example embodiments of the present disclosure.
Figure 3:
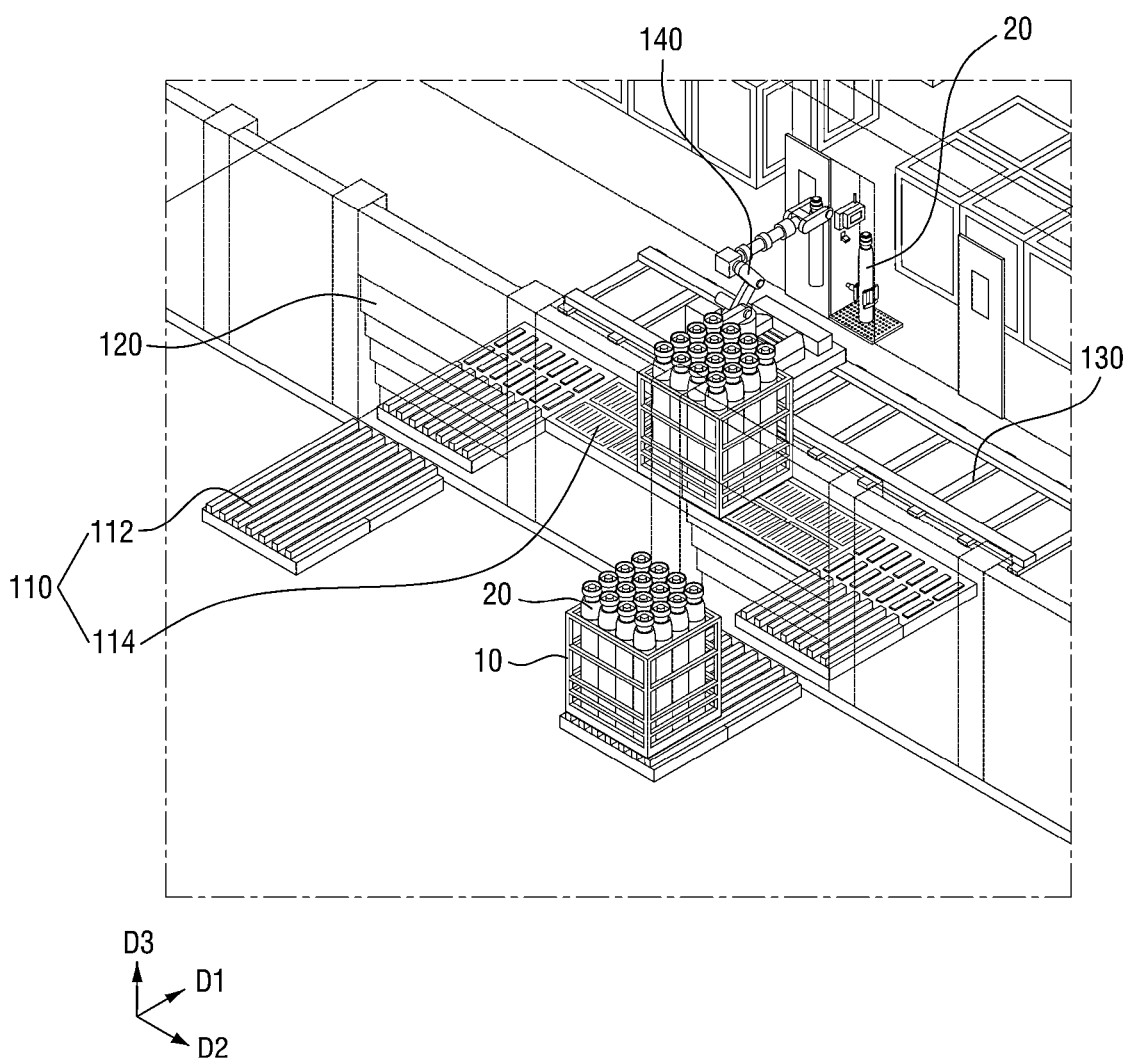
FIG. 3 is a view for describing a gas cylinder transfer unit of FIGS. 1 and 2.

FIGS. 1 and 2 are views for describing an automated gas supply system according to some example embodiments of the present disclosure. FIG. 3 is a view for describing a gas cylinder transfer unit of FIGS. 1 and 2.

Referring to FIGS. 1 to 3, the automated gas supply system according to some example embodiments of the present disclosure may include a gas cylinder transfer unit 100, a gas cylinder inspection unit 200, a gas cylinder storage unit 300, a gas cylinder replacement unit 400, at least one mobile robot 500, and a controller 600.

The controller 600 may control the automated gas supply system. The controller 600 may control the gas cylinder transfer unit 100, the gas cylinder inspection unit 200, the gas cylinder storage unit 300, the gas cylinder replacement unit 400, and at least one mobile robot 500.

Gas cylinders 20 unloaded from a vehicle may be stored in a cradle 10 and provided to the automated gas supply system.

The gas cylinder transfer unit 100 may include a transfer unit 110 and a transfer robot 140. The gas cylinder transfer unit 100 may transfer the gas cylinder 20 into the automated gas supply system through a door 120 of the automated gas supply system. The gas cylinder transfer unit 100 and the door 120 may be operated according to a command of the controller 600.

The cradle 10 may be loaded on the transfer unit 110. When the cradle 10 is loaded on the transfer unit 110, a worker may transmit gas cylinder warehousing information to the controller 600. The controller 600 may control the gas cylinder transfer unit 100 and the door 120.

The transfer unit 110 may include a first transfer unit 112 and a second transfer unit 114. The first transfer unit 112 may extend in a first direction D1. The first transfer unit 112 may move the cradle 10 in the first direction D1. The cradle 10 may enter the automated gas supply system.

The second transfer unit 114 may extend in a second direction D2. The second direction D2 may be a direction perpendicular to the first direction D1. The second transfer unit 114 may move the cradle 10 in the second direction D2.

A guide rail 130 may be disposed at a side surface of the second transfer unit 114. The guide rail 130 may extend in the second direction D2. The transfer robot 140 may move in the second direction D2 along the guide rail 130.

The transfer robot 140 may separate one or more gas cylinders 20 stored in the cradle 10 in units of gas cylinders 20. That is, the transfer robot 140 may grip the gas cylinder 20 and move the gas cylinder 20 to the gas cylinder inspection unit 200. The transfer robot 140 may further include a vision module (not illustrated). The transfer robot 140 may locate a grip portion outside the cylinder through the vision module. Also, the transfer robot 140 may identify a distance to the gas cylinder inspection unit 200 through the vision module. Therefore, the transfer robot 140 may more accurately move the gas cylinder 20 to the gas cylinder inspection unit 200.

Meanwhile, when empty gas cylinders 20 are shipped out, the transfer robot 140 may gather the gas cylinders 20 in units of the cradle 10. That is, the transfer robot 140 may pick up the gas cylinders 20 and gather the gas cylinders 20 on the cradle 10. Therefore, the gas cylinders 20 may be shipped out in units of the cradle 10.

Figure 4:
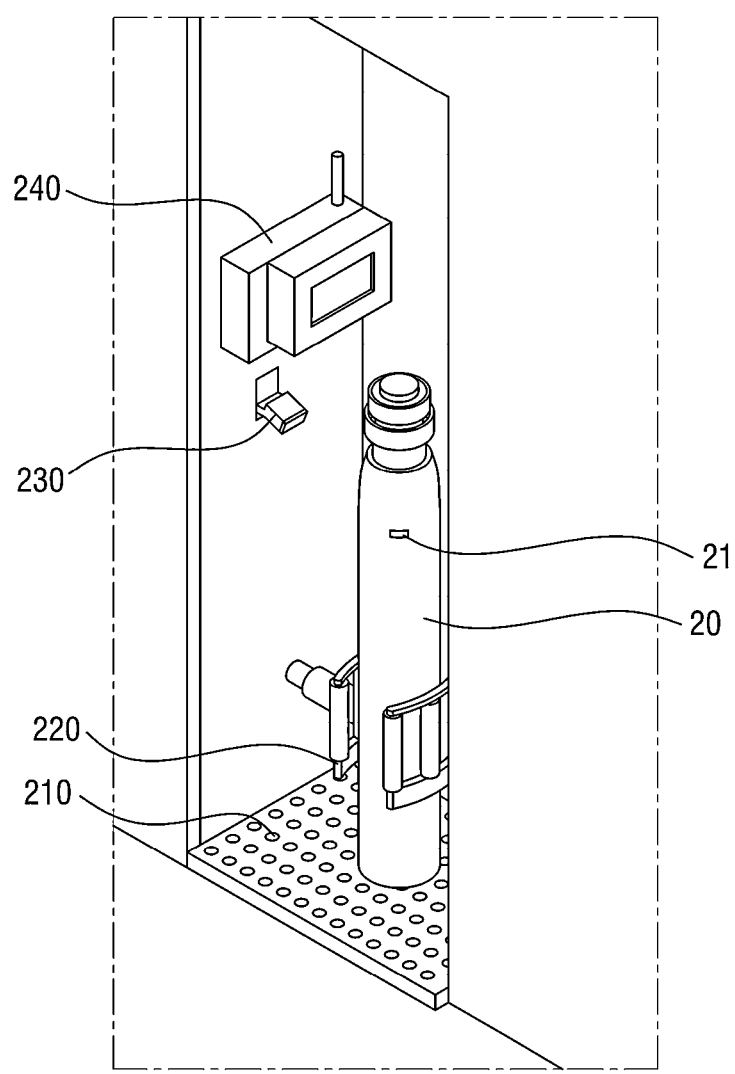
FIG. 4 is a view for describing a gas cylinder inspection unit of FIGS. 1 and 2.

FIG. 4 is a view for describing the gas cylinder inspection unit of FIGS. 1 and 2. Referring to FIGS. 1, 2, and 4, the gas cylinder inspection unit 200 may include a work unit 210, a barcode reader 230, a first gripper 220, and a first gas detector 240. The gas cylinder inspection unit 200 may check the properties of the gas in the gas cylinder 20 and check whether the gas leaks.

The gas cylinder inspection unit 200 may recognize the gas cylinder 20 and open/close an entrance of the gas cylinder inspection unit 200. The transfer robot 140 may transfer the gas cylinder 20 to the gas cylinder inspection unit 200. The gas cylinder 20 may be seated on the work unit 210 by the transfer robot 140.

The gas cylinder inspection unit 200 may further include a camera (not illustrated). The camera may identify an outer shape of the gas cylinder 20 that rotates due to the first gripper 220 and may identify the position of a barcode 21 attached to the outside of the gas cylinder 20. Also, the camera may check the shape of a valve of the gas cylinder 20.

The barcode reader 230 may recognize the barcode 21 attached to the gas cylinder 20. The controller 600 may receive recognized barcode data from the barcode reader 230. For example, the barcode data may include information on a gas such as the properties of the gas stored in the gas cylinder 20. For example, the controller 600 may determine whether the properties of the gas stored in the gas cylinder 20 that are received from the barcode reader 230 match the properties of the gas stored in the gas cylinder 20 that are received from the gas cylinder transfer unit 100.

Also, the controller 600 may, on the basis of the information on the gas stored in the gas cylinder 20 that is received from the barcode reader 230, determine the stock of the gas cylinders 20 in the automated gas supply system.

The first gripper 220 may surround at least a portion of a sidewall of the gas cylinder 20. For example, the first gripper 220 may have a structure in the shape of pincers. The present disclosure is not limited thereto, and the first gripper 220 may also have another structure so long as the structure is able to fix the gas cylinder 20. The first gripper 220 may rotate the gas cylinder 20 to allow the barcode reader 230 to recognize the barcode 21 of the gas cylinder 20. The work unit 210 may be designed to reduce friction generated while the first gripper 220 rotates.

The first gas detector 240 may check whether the gas leaks from the gas cylinder 20 in a state in which all entrances and exits of the gas cylinder inspection unit 200 are closed. Therefore, the gas cylinder inspection unit 200 may determine whether an abnormality has occurred in the gas cylinder 20 in the process of transferring the gas cylinder 20.

Figure 5:
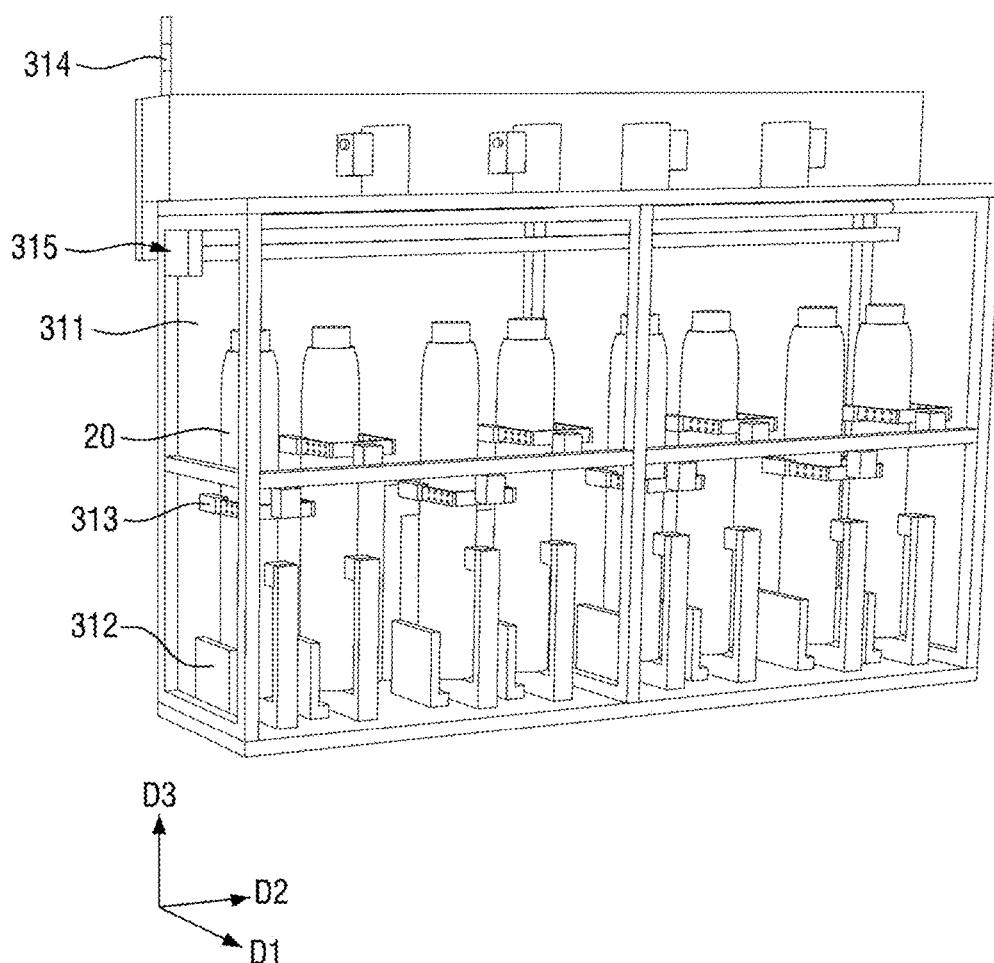
FIG. 5 is a view for describing a gas cylinder storage unit of FIGS. 1 and 2.
Figure 6:
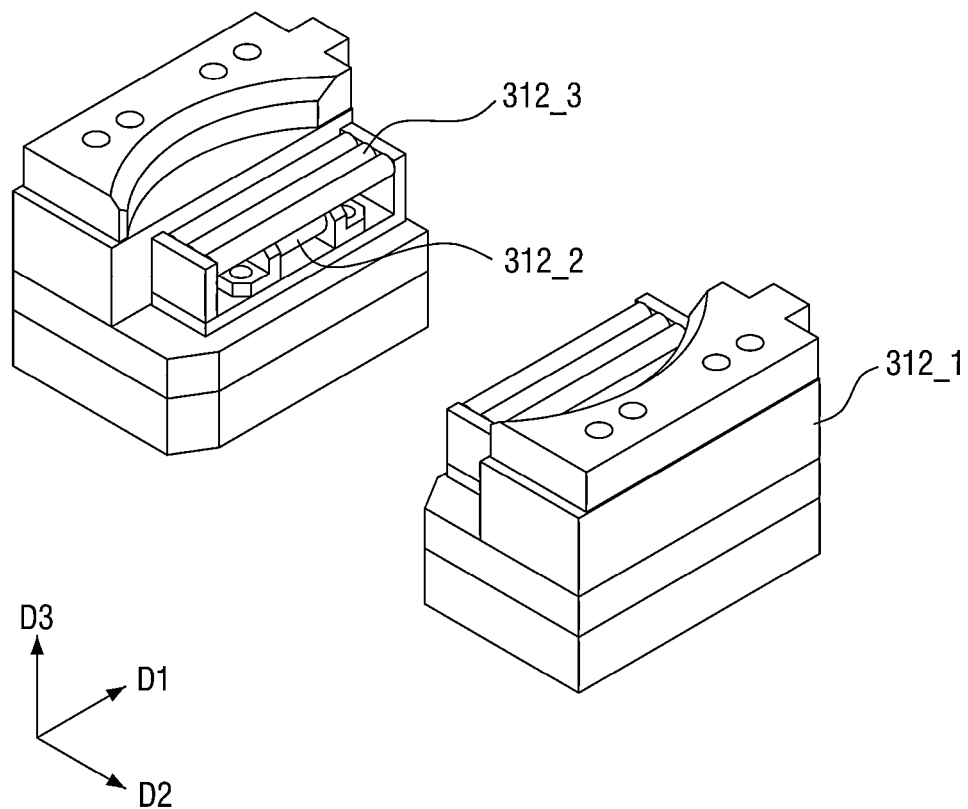
FIG. 6 is a view for describing a first seating unit of FIG. 5.
Figure 7:
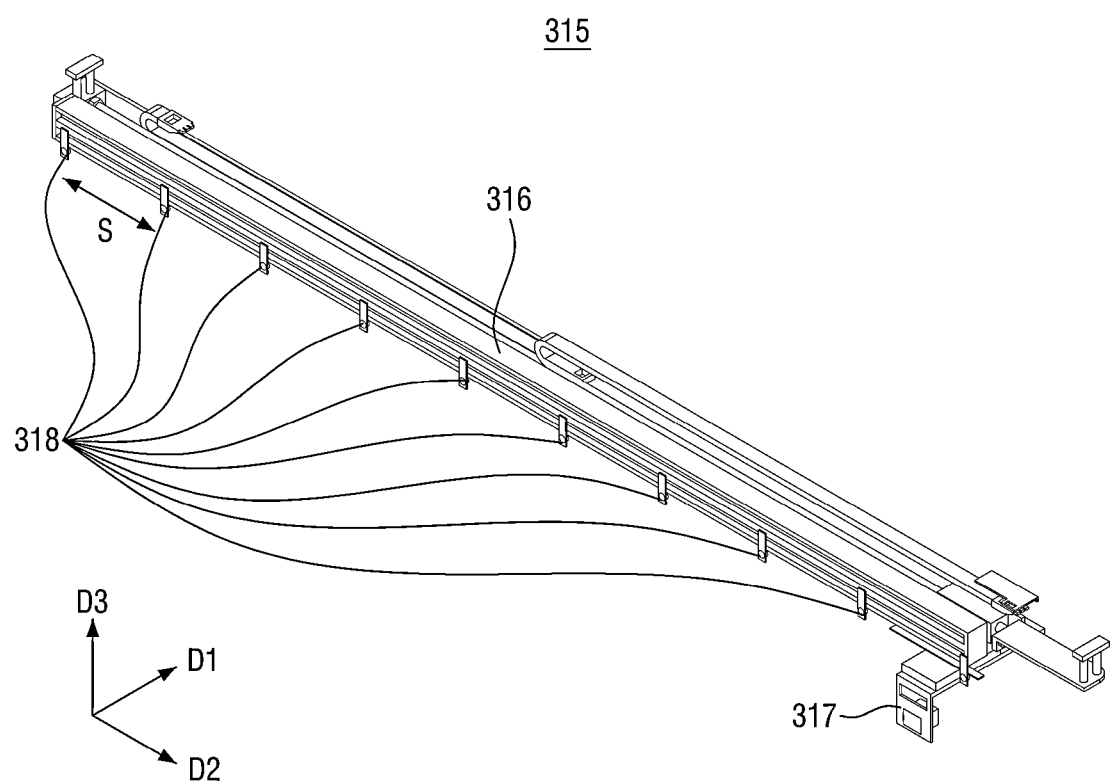
FIG. 7 is a view for describing a recognition unit of FIG. 5.

FIG. 5 is a view for describing the gas cylinder storage unit of FIGS. 1 and 2. FIG. 6 is a view for describing a first seating unit of FIG. 5, and FIG. 7 is a view for describing a recognition unit of FIG. 5.

Referring to FIGS. 1, 2, and 5 to 7, the gas cylinder storage unit 300 may include at least one storage queue 310. The storage queue 310 may include an entry/exit unit 311, a first seating unit 312, a second gripper 313, a second gas detector 314, and a recognition unit 315. The storage queue 310 may receive the gas cylinder 20 from the gas cylinder inspection unit 200 by a mobile robot 500 which will be described below.

The entry/exit unit 311 may move in the second direction D2, and the storage queue 310 may be opened/closed. The entry/exit unit 311 may be opened when the mobile robot 500 having the gas cylinder 20 loaded thereon moves to the storage queue 310. The entry/exit unit 311 may be a sliding door.

The first seating unit 312 may be disposed at a lower surface of the storage queue 310. The gas cylinder 20 may be seated on the first seating unit 312 by the mobile robot 500. The second gripper 313 may be disposed on a sidewall of the storage queue 310. The second gripper 313 may surround a side surface of the gas cylinder 20 stored in the first seating unit 312. The gas cylinder 20 may be fixed to the storage queue 310 by the second gripper 313.

The first seating unit 312 may further include a first seating unit body 312_1, a roller unit 312_3, and a moving unit 312_2. The first seating unit body 312_1 may have an L-shape. The first seating unit body 312_1 may include a portion having a first height and a portion having a second height which is higher than the first height. The roller unit 312_3 and the moving unit 312_2 may be disposed on the portion having the first height of the first seating unit body 312_1.

The roller unit 312_3 may include a plurality of rollers that extend in the first direction D1. The gas cylinder 20 may be moved in the first direction D1 by the roller unit 312_3.

The moving unit 312_2 may be disposed at a lower surface of the roller unit 312_3. The moving unit 312_2 may move the roller unit 312_3 in the first direction D1. The gas cylinder 20 may be moved in the second direction D2 by the moving unit 312_2. That is, the gas cylinders 20 may be aligned in the second direction D2 by the roller unit 312_3 and aligned in the first direction D1 by the moving unit 312_2.

In example embodiments where a bottom surface of the first seating unit 312 is flat, when the gas cylinder 20 is seated on the first seating unit 312 by the second gripper 313, an upper portion of the gas cylinder 20 that is fixed by the second gripper 313 may be tilted toward the inside of the storage queue 310 due to a frictional force. Therefore, the gas cylinder 20 is unable to be safely stored in the storage queue 310.

However, according to some example embodiments of the present disclosure, since the roller unit 312_3 is disposed on the first seating unit 312, it is possible to reduce or prevent the upper portion of the gas cylinder 20 from tilting, and thus the gas cylinder 20 may be more safely seated on the first seating unit 312.

A holding sensor (not illustrated) may be disposed on the second gripper 313. The holding sensor may detect whether the second gripper 313 is holding the gas cylinder 20. The controller 600 may, from the holding sensor, receive information on whether the second gripper 313 is holding the gas cylinder 20.

According to whether the second gripper 313 is holding the gas cylinder 20, the controller 600 may determine the position of the second gripper 313 which will hold the gas cylinder 20, that is, the position of the first seating unit 312 on which the gas cylinder 20 is seated. The mobile robot 500 may provide the gas cylinder 20 to the position determined by the controller 600.

The second gas detector 314 may, when the storage queue 310 is closed, detect whether the gas leaks from the gas cylinder 20. The controller 600 may, from the second gas detector 314, receive detected information on whether the gas leaks from the gas cylinder 20 in the storage queue 310.

The recognition unit 315 may be disposed on the sidewall of the storage queue 310. The recognition unit 315 may include a pneumatic actuator 316, a barcode reader 317, and a plurality of position sensors 318.

The pneumatic actuator 316 may, according to control of the controller 600, move in the second direction D2 along the sidewall of the storage queue 310. Since the gas cylinder 20 may store a flammable gas therein, there may be a risk of fire or explosion in example embodiments where an electric actuator is used. However, due to using the pneumatic actuator 316, the present disclosure is able to reduce or prevent a risk of fire or explosion caused by the gas stored in the gas cylinder 20.

The barcode reader 317 may, according to control of the controller 600, recognize the barcode 21 attached to the gas cylinder 20. The barcode reader 317 may be coupled to the pneumatic actuator 316 and move in the second direction D2 due to the pneumatic actuator 316. Due to characteristics of the pneumatic actuator 316, the pneumatic actuator 316 may have difficulty in controlling the barcode reader 317 to reach a set position. Therefore, the recognition unit 315 of the present disclosure may further include the plurality of position sensors 318.

The plurality of position sensors 318 may be disposed at predetermined or alternatively, desired intervals in the second direction D2 along the pneumatic actuator 316. In example embodiments where the gas cylinder 20 is seated on the first seating unit 312, the plurality of position sensors 318 may be disposed at both side surfaces of the gas cylinder 20 in the second direction D2. That is, the predetermined or alternatively, desired interval may be greater than a width of the gas cylinder 20 in the second direction D2.

The barcode reader 317 may recognize the barcode 21 attached to the gas cylinder 20 while, due to the pneumatic actuator 316, moving in the second direction D2 in a section S between the position sensors 318 adjacent to each other. That is, the barcode reader 317 may start a barcode recognition operation at a position sensor 318 disposed in front of the first seating unit 312 on which the gas cylinder 20 is seated and may end the barcode recognition operation at a position sensor 318 disposed behind the first seating unit 312 on which the gas cylinder 20 is seated. The controller 600 may receive recognized barcode data from the barcode reader 317.

Figure 8:
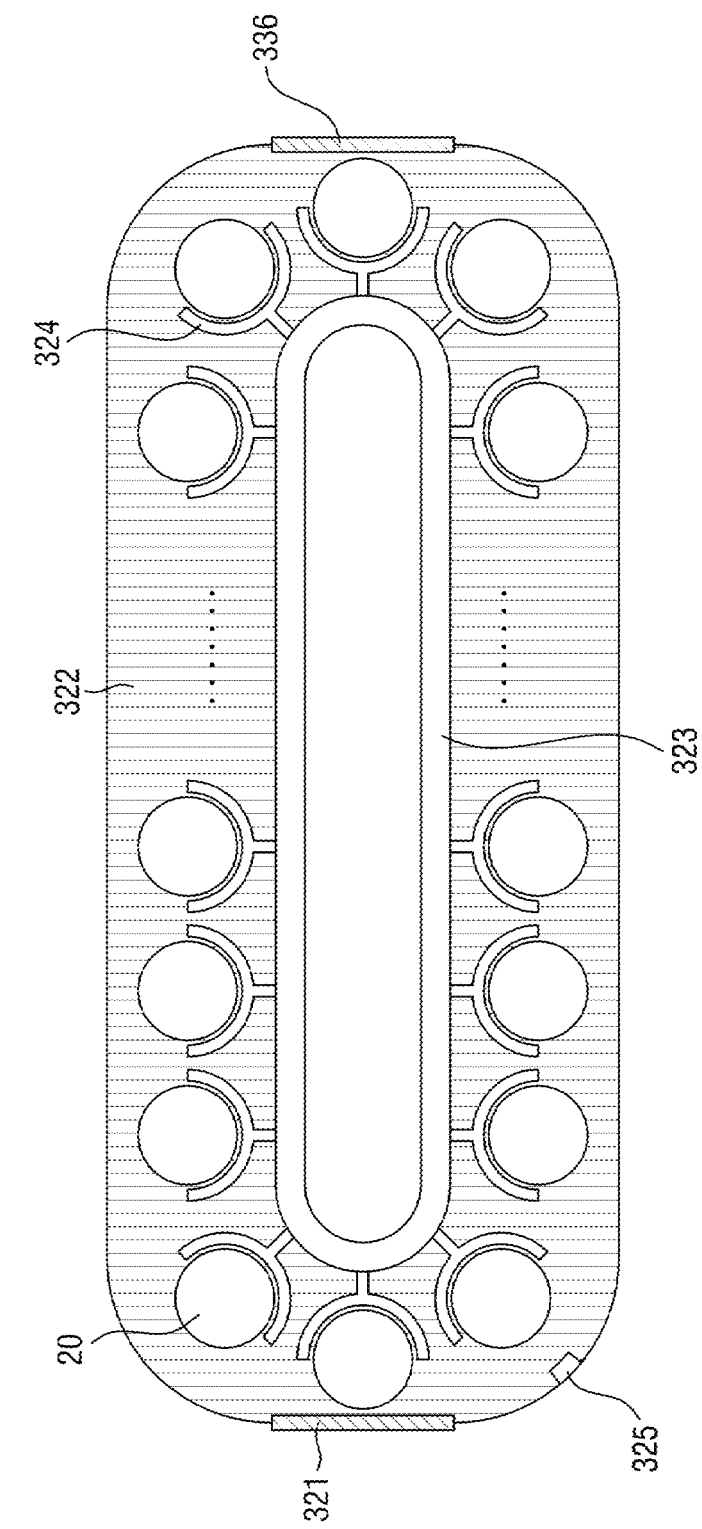
FIG. 8 is a view for describing the gas cylinder storage unit of FIGS. 1 and 2 according to some other example embodiments of the present disclosure.

FIG. 8 is a view for describing the gas cylinder storage unit of FIGS. 1 and 2 according to some other example embodiments of the present disclosure. Differences from FIG. 5 will be mainly described.

Referring to FIGS. 1, 2, and 8, the gas cylinder storage unit 300 may include at least one storage queue 320. The storage queue 320 may include an entry unit 321, a roller unit 322, a rotation module 323, a second gripper 324, a vision module 325, and an exit unit 326. The gas cylinder 20 may be provided into the storage queue 320 through the entry unit 321.

The gas cylinder 20 may be loaded on the roller unit 322. The vision module 325 may read information on the gas cylinder 20 provided into the storage queue 320 through the entry unit 321. For example, the vision module 325 may be a barcode reader that recognizes the barcode 21 attached to the gas cylinder 20.

One or more second grippers 324 may be disposed along a side surface of the rotation module 323 about the rotation module 323. Therefore, a large number of gas cylinders 20 may be efficiently stored in a small space.

The second grippers 324 may be disposed at predetermined or alternatively, desired intervals along an outer side surface of the rotation module 323. The second gripper 324 may surround a side surface of the gas cylinder 20 and fix the gas cylinder 20. When the gas cylinder 20 is provided to the storage queue 320 through the entry unit 321, the rotation module 323 may rotate. As the rotation module 323 rotates, the gas cylinder 20 fixed to the second gripper 324 may be moved by the roller unit 322.

The exit unit 326 may be disposed at a side surface of the storage queue 320 that faces the entry unit 321.

The gas cylinders 20 stored in the storage queue 320 may be moved left or right along a direction of rotation of the rotation module 323. Therefore, the gas cylinders 20 may be disposed at the exit unit 326 according to the order in which the gas cylinders 20 are stored in the storage queue 320 and may be provided to the gas cylinder replacement unit 400 through the exit unit 326. Accordingly, the gas cylinders 20 may be provided from the storage queue 320 to the gas cylinder replacement unit 400 according to expiration dates thereof without being congested.

Figure 9:
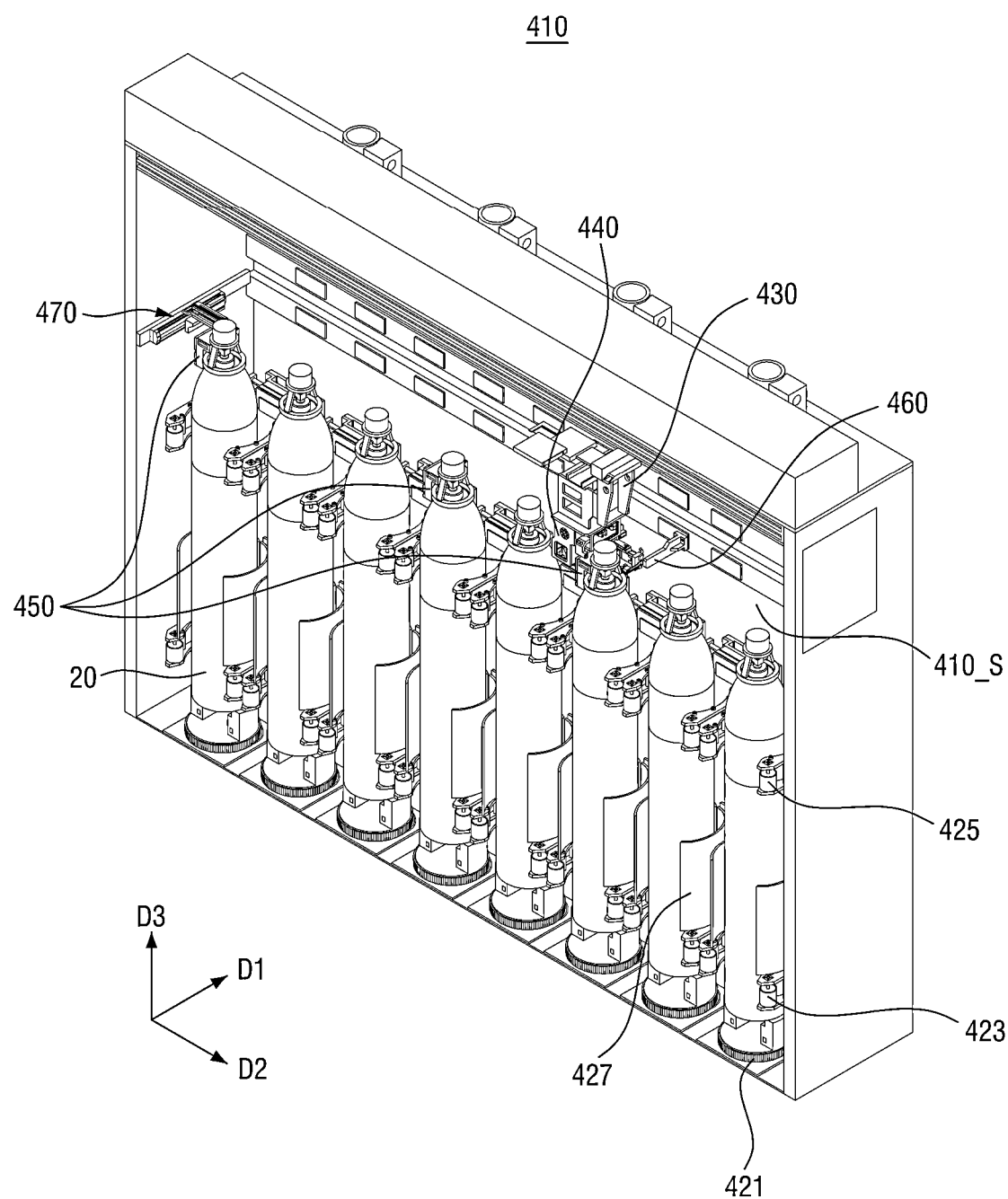
FIG. 9 is a view for describing a gas cylinder replacement unit of FIGS. 1 and 2.

FIG. 9 is a view for describing the gas cylinder replacement unit of FIGS. 1 and 2.

Referring to FIGS. 1, 2, and 9, the gas cylinder replacement unit 400 may include at least one gas cabinet 410. The gas in the gas cylinder 20 may be connected to a gas pipe, which is connected to a semiconductor process line, through the gas cabinet 410 and supplied to the semiconductor process line.

The gas cabinet 410 may include a residual gas detector (not illustrated), a lower clamp module 423, an upper clamp module 425, a heating jacket 427, a second seating unit 421, a traveling unit 430, a common fastening device 440, a fastening unit 450, and a Compressed Gas Association (CGA) plug unit 460.

The residual gas detector may detect the amount of gas stored in the gas cylinder 20 connected to the gas pipe, which is connected to the semiconductor process line, in the gas cabinet 410. The controller 600 may receive the detected amount of residual gas stored in the gas cylinder 20 from the residual gas detector. The controller 600 may determine whether the amount of residual gas is less than or equal to a set amount of residual gas and may control the mobile robot 500 and the gas cabinet 410 to replace the gas cylinder 20. The mobile robot 500 may recover the gas cylinder 20 from the gas cabinet 410 due to control of the controller 600 and may provide a gas cylinder 20 from the gas cylinder storage unit 300 to the gas cabinet 410 according to properties of the gas stored in the recovered gas cylinder 20.

Here, the controller 600 may, in consideration of a battery of the mobile robot 500 or the position of the mobile robot 500, control the most efficient mobile robot 500 to recover the gas cylinder 20 from the gas cabinet 410. Also, the controller 600 may control the most efficient mobile robot 500 to provide the gas cylinder 20 from the gas cylinder storage unit 300 to the gas cabinet 410.

Figure 10:
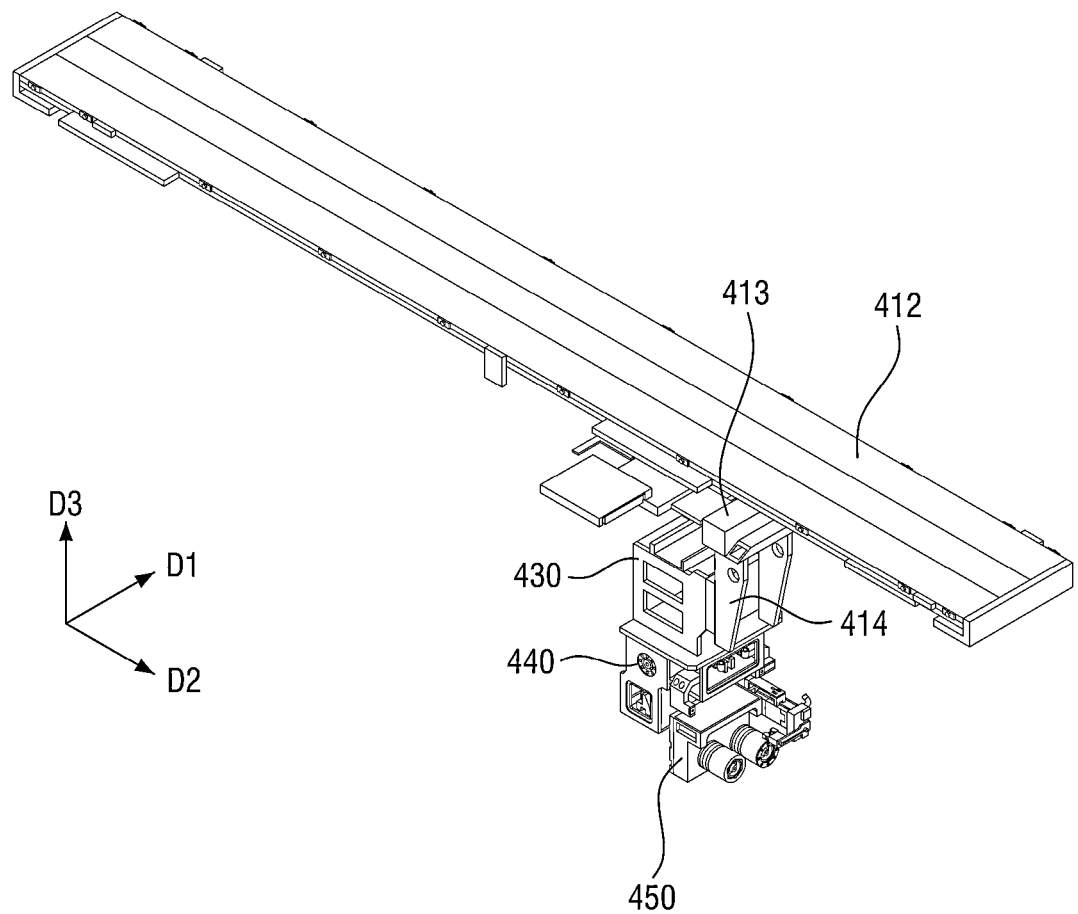
FIG. 10 is a view for describing a traveling unit of FIG. 9.
Figure 11:
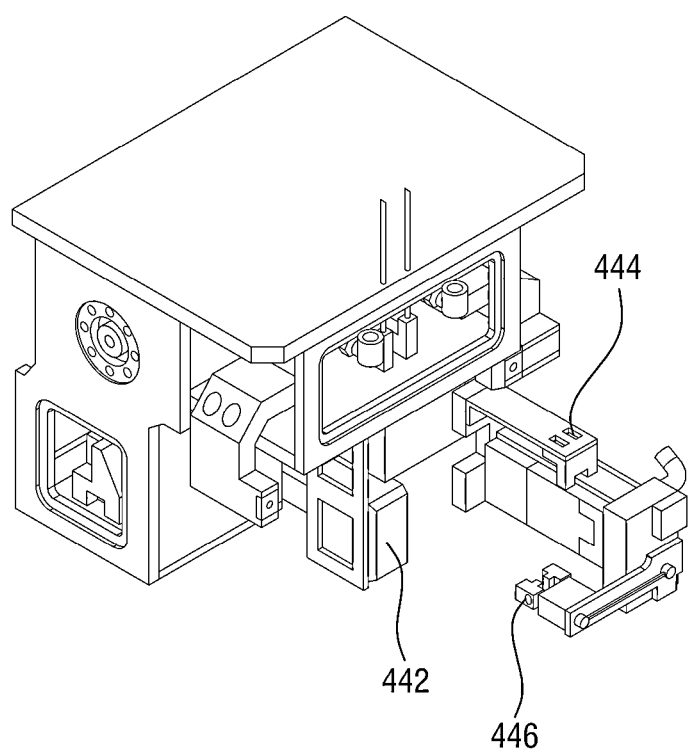
FIG. 11 is a view for describing a common fastening device of FIG. 9.
Figure 12:
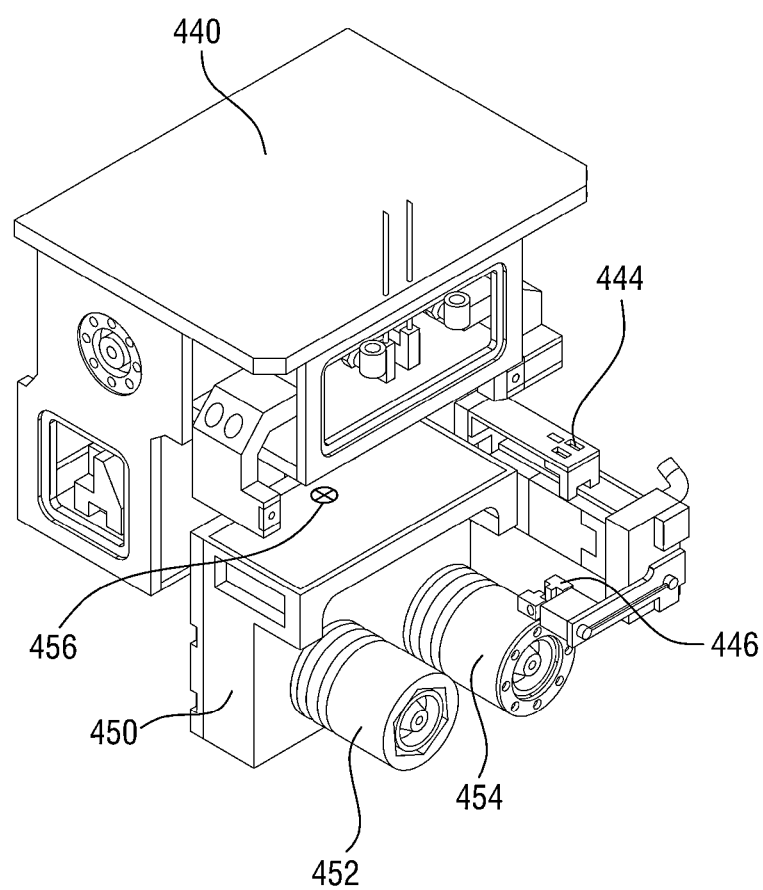
FIG. 12 is a view for describing a fastening unit of FIG. 9.
Figure 13:
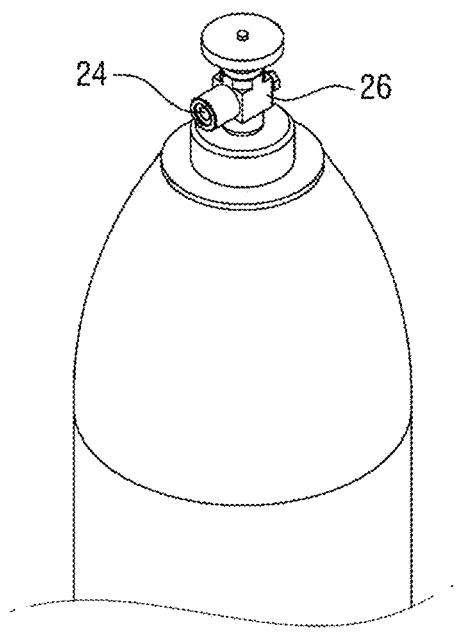
FIG. 13 is a view for describing a gas cylinder.

FIG. 10 is a view for describing the traveling unit of FIG. 9. FIG. 11 is a view for describing the common fastening device of FIG. 9. FIG. 12 is a view for describing the fastening unit of FIG. 9. FIG. 13 is a view for describing the gas cylinder.

Referring to FIGS. 1, 2, and 9 to 12, a first guide rail 412 may be disposed on an upper surface of the gas cabinet 410. The first guide rail 412 may extend in the second direction D2 which is the longitudinal direction of the gas cabinet 410. A second guide rail 413 may be disposed on a lower surface of the first guide rail 412. The second guide rail 413 may extend in the first direction D1. A third guide rail 414 may be disposed on a lower surface of the second guide rail 413. The third guide rail 414 may extend in a third direction D3.

The traveling unit 430 may be coupled to the third guide rail 414. The traveling unit 430 may include a first actuator (not illustrated) therein. The traveling unit 430 may obtain power from the first actuator and move in the first, second, and third directions D1, D2, and D3 along the first, second, and third guide rails 412, 413, and 414.

The common fastening device 440 may be coupled to the traveling unit 430. The common fastening device 440 may be coupled to a lower surface of the traveling unit 430. Due to the traveling unit 430, the common fastening device 440 may move in the first, second, and third directions D1, D2, and D3 along the first, second, and third guide rails 412, 413, and 414.

Meanwhile, referring to FIG. 13, the gas cylinder 20 may include a valve body 26 and a gas spray nozzle 24. A valve may be connected to the valve body 26. The gas spray nozzle 24 may protrude outward from the valve body 26. The gas stored in the gas cylinder 20 may be supplied to the outside through the gas spray nozzle 24. An end cap (not illustrated) may be coupled to the gas spray nozzle 24. For example, the end cap may be screw-coupled to the gas spray nozzle 24.

Referring back to FIGS. 9 to 13, a plurality of fastening units 450 may be disposed on a sidewall of the gas cabinet 410. The fastening unit 450 may be disposed at a side surface of the gas spray nozzle 24 of the gas cylinder 20 in the second direction D2. The fastening unit 450 may include a CGA holder unit 452 and an end cap holder unit 454 which protrude from an outer side surface of the fastening unit 450. The CGA holder unit 452 may be connected to the gas pipe which is connected to the semiconductor process line. The end cap holder unit 454 may be coupled to the end cap which is coupled to the gas spray nozzle 24 of the gas cylinder 20.

An alignment mark 456 may be formed on an upper surface of the fastening unit 450. The alignment mark 456 may be a mark that indicates an alignment state of the fastening unit 450. For example, the alignment mark 456 may have a circular shape including a cross shape formed therein as illustrated in FIG. 12, but the present disclosure is not limited thereto.

The common fastening device 440 may include a vision sensor 442 and a second actuator (not illustrated).

The common fastening device 440 may be coupled to the traveling unit 430 and moved to a teaching point at which the fastening unit 450 is located. Then, the vision sensor 442 may detect the alignment mark disposed on the upper surface of the fastening unit 450. On the basis of the alignment mark detected by the vision sensor 442, the controller 600 may determine the alignment of the common fastening device 440 and the fastening unit 450 in the first direction D1 and the second direction D2.

The controller 600 may control the traveling unit 430 so that the common fastening device 440 is aligned with the fastening unit 450. Due to the traveling unit 430, the common fastening device 440 may move in the first direction D1 and the second direction D2 and be aligned with the fastening unit 450. Then, the aligned common fastening device 440 may move in the third direction D3 and be coupled to the fastening unit 450. That is, a degree at which the common fastening device 440 and the fastening unit 450 are misaligned may be compensated for by the traveling unit 430 and the common fastening device 440.

Therefore, according to the present disclosure, a single common fastening device 440 may be coupled to any one of the plurality of fastening units 450 according to control of the controller 600.

Also, in order to be coupled to the gas cylinder 20, the fastening unit 450 coupled to the common fastening device 440 may be moved to a teaching point at which the gas spray nozzle 24 is located. The vision sensor 442 may detect a contour of the gas spray nozzle 24. On the basis of the contour of the gas spray nozzle 24 that is received from the vision sensor 442, the controller 600 may determine whether the fastening unit 450 and the gas spray nozzle 24 are aligned in the first, second, and third directions D1, D2, and D3.

The controller 600 may control the traveling unit 430 so that the fastening unit 450 is aligned with the gas spray nozzle 24. Due to the traveling unit 430, the fastening unit 450 may move in the first, second, and third directions D1, D2, and D3 and be aligned with the gas spray nozzle 24. That is, a degree at which the gas spray nozzle 24 and the fastening unit 450 are misaligned may be compensated for by the traveling unit 430 and the common fastening device 440.

The second actuator may transmit power to the CGA holder unit 452 and the end cap holder unit 454 of the fastening unit 450 which is coupled to the common fastening device 440. The second actuator may be, for example, a motor. The CGA holder unit 452 and the end cap holder unit 454 may rotate clockwise or counterclockwise due to the second actuator.

Therefore, the CGA holder unit 452 may be coupled to or separated from the gas spray nozzle 24 due to the second actuator. The end cap holder unit 454 may be coupled to the end cap, which is coupled to the gas spray nozzle 24, due to the second actuator and separate the end cap from the gas spray nozzle 24 or may couple the end cap, which is coupled to the end cap holder unit 454, to the gas spray nozzle 24 again.

That is, in example embodiments where the gas cylinder 20 is seated in the gas cabinet 410, the common fastening device 440 may be aligned with the fastening unit 450, which is disposed at the side surface of the seated gas cylinder 20, and then coupled. The end cap, which is coupled to the gas spray nozzle 24 of the gas cylinder 20, may be coupled to the end cap holder unit 454 of the fastening unit 450 due to the common fastening device 440, and the gas spray nozzle 24 may be connected to the CGA holder unit 452 of the fastening unit 450. In example embodiments where the gas stored in the gas cylinder 20 is exhausted, due to the common fastening device 440, the gas spray nozzle 24 may be separated from the CGA holder unit 452 of the fastening unit 450 and may be coupled to the end cap holder unit 454 and coupled to the end cap again.

Figure 14:
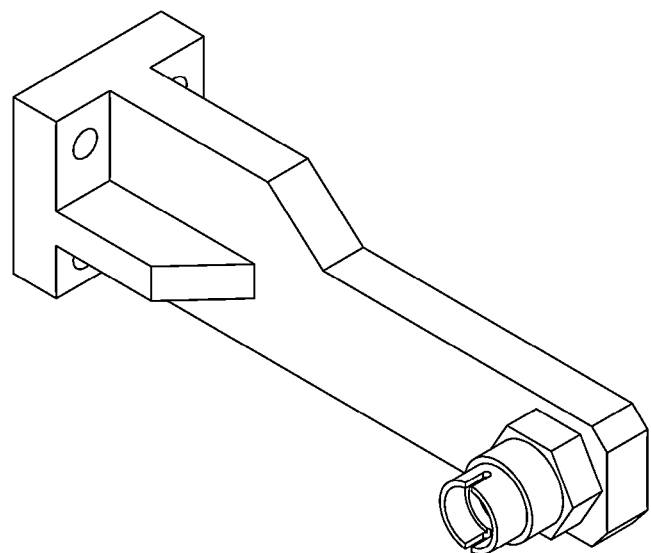
FIG. 14 is a view for describing a Compressed Gas Association (CGA) plug unit of FIG. 9.

FIG. 14 is a view for describing the CGA plug unit of FIG. 9.

Referring to FIGS. 1, 2, and 9 to 14, the CGA plug unit 460 may be disposed on the sidewall of the gas cabinet 410. The CGA plug unit 460 may be disposed at the side surface of the gas spray nozzle 24 of the gas cylinder 20 in the second direction D2.

In example embodiments where the amount of residual gas stored in the gas cylinder 20, which is connected to the CGA holder unit 452 of the fastening unit 450, is less than or equal to a set amount of residual gas, the gas cylinder 20 may be recovered by the mobile robot 500. In example embodiments where the gas cylinder 20 is recovered, the CGA holder unit 452 of the fastening unit 450 may be connected to the CGA plug unit 460. In example embodiments where a new gas cylinder 20 is provided to the gas cabinet 410 by the mobile robot 500, the common fastening device 440 may be coupled to the fastening unit 450, and power may be provided to the CGA holder unit 452 to separate the CGA plug unit 460 from the CGA holder unit 452.

Figure 15:
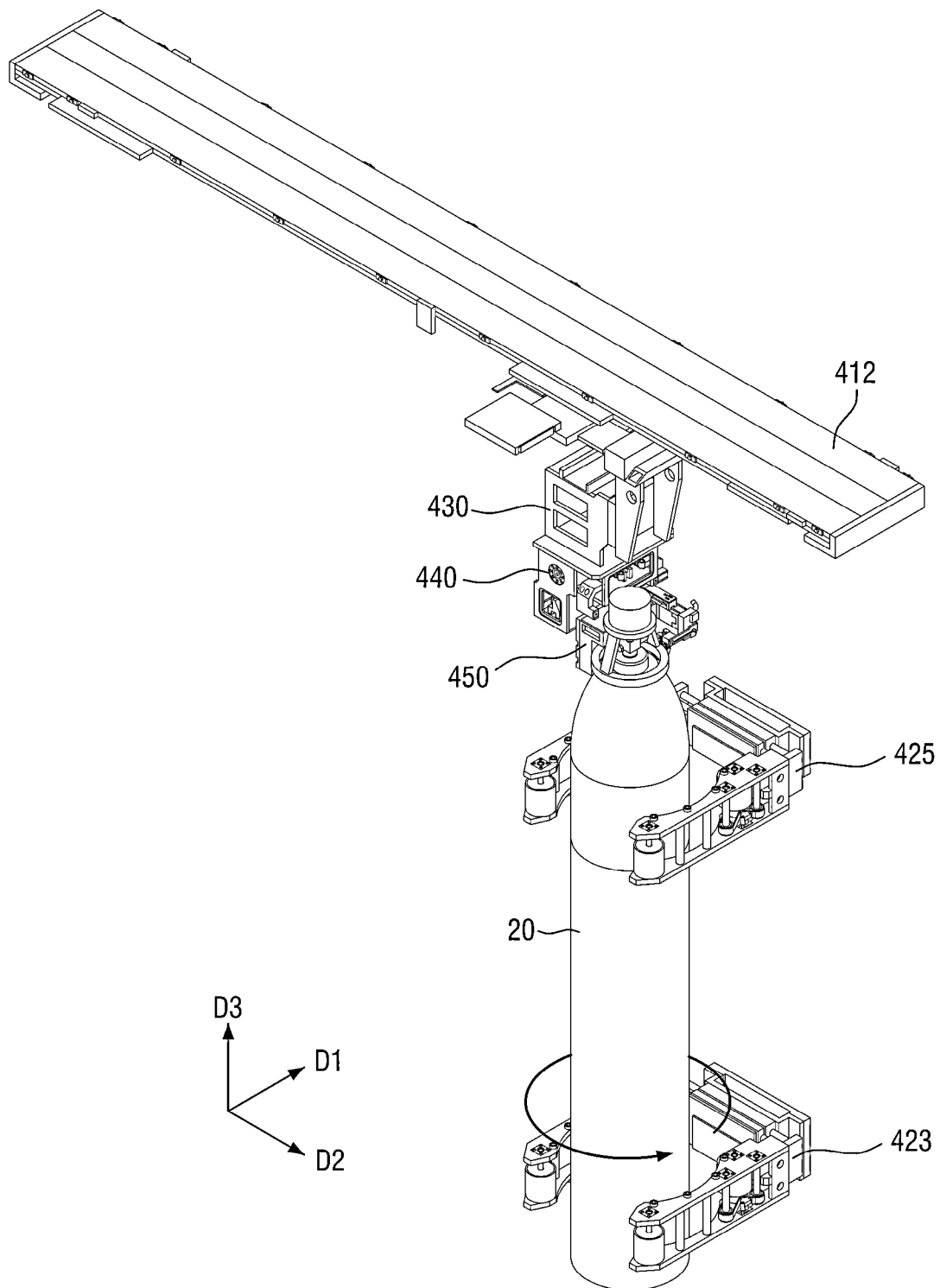
FIG. 15 is a view for describing operation of a gas cylinder replacement unit of FIG. 9.
Figure 16:
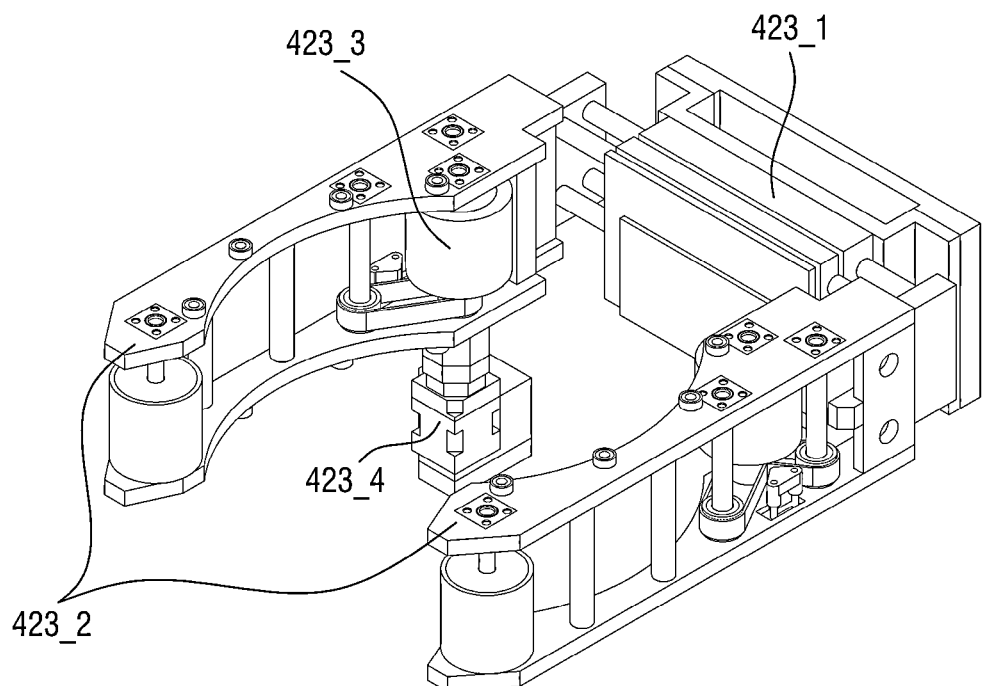
FIG. 16 is a view for describing a lower clamp module of FIG. 9.

FIG. 15 is a view for describing operation of the gas cylinder replacement unit of FIG. 9. FIG. 16 is a view for describing the lower clamp module of FIG. 9.

Referring to FIGS. 1, 2, and 9 to 16, the lower clamp module 423 and the upper clamp module 425 may be disposed on the sidewall of the gas cabinet 410. The upper clamp module 425 may be disposed above the lower clamp module 423 in the third direction D3.

The lower clamp module 423 may clamp a lower side surface of the gas cylinder 20. The upper clamp module 425 may clamp an upper side surface of the gas cylinder 20. The lower clamp module 423 and the upper clamp module 425 may have the same structure. Hereinafter, the lower clamp module 423 will be described.

The lower clamp module 423 may include a clamp body 423_1, a clamp arm 423_2, and a third actuator 423_4.

The clamp body 423_1 may be disposed on the sidewall of the gas cabinet 410. The clamp arm 423_2 may be disposed at both sides with respect to the clamp body 423_1.

The clamp arm 423_2 may have the shape of a pincer to surround a side surface of the gas cylinder 20. An inner side surface of the clamp arm 423_2 may have a round shape to surround the gas cylinder 20. The clamp arm 423_2 may include a roller 423_3.

The third actuator 423_4 may be disposed at a lower surface of the clamp arm 423_2. The third actuator 423_4 may be connected to a lower surface of the roller 423_3. The third actuator 423_4 may provide power to the roller 423_3.

Also, the heating jacket 427 may be disposed between the lower clamp module 423 and the upper clamp module 425. The heating jacket 427 may surround a portion of the gas cylinder 20. The present disclosure is not limited thereto, and the heating jacket 427 may also surround the entire gas cylinder 20. In example embodiments where the gas in the gas cylinder 20 is in a liquid state, the heating jacket 427 may apply heat to the gas cylinder 20. The heating jacket 427 may raise a temperature of the gas cylinder 20, and accordingly, the gas may be smoothly provided to the gas pipe.

In example embodiments where, in order to be coupled to the gas spray nozzle 24 of the gas cylinder 20, the fastening unit 450 coupled to the common fastening device 440 moves to the teaching point at which the gas spray nozzle 24 is located, the vision sensor 442 may detect the contour of the gas spray nozzle 24 of the gas cylinder 20 and a contour of the valve body 26 of the gas cylinder 20.

The controller 600 may compare the center of the contour of the gas spray nozzle 24 and the center of the contour of the valve body 26 of the gas cylinder 20 that are received from the vision sensor 442. By comparing the center of the contour of the gas spray nozzle 24 and the center of the contour of the valve body 26 of the gas cylinder 20, the controller 600 may determine whether the gas cylinder 20 is aligned. That is, the controller 600 may determine whether the gas cylinder 20 is tilted with respect to the third direction D3.

The controller 600 may control the lower clamp module 423 and the upper clamp module 425 so that the gas cylinder 20 is not tilted with respect to the third direction D3. The lower clamp module 423 and/or the upper clamp module 425 may align the gas cylinder 20 in the third direction D3 by using the roller 423_3. That is, a degree at which the gas cylinder 20 is tilted with respect to the third direction D3 may be compensated for by the roller 423_3.

Therefore, in the automated gas supply system according to some example embodiments of the present disclosure, the common fastening device 440 is aligned with the fastening unit 450 and then coupled to the fastening unit 450, and the gas spray nozzle 24 and the fastening unit 450 are coupled after the gas cylinder 20 is aligned in the third direction D3. Thus, the gas cylinder 20 and the gas pipe, which is connected to the semiconductor process line, may be automatically aligned and connected.

Figure 17:
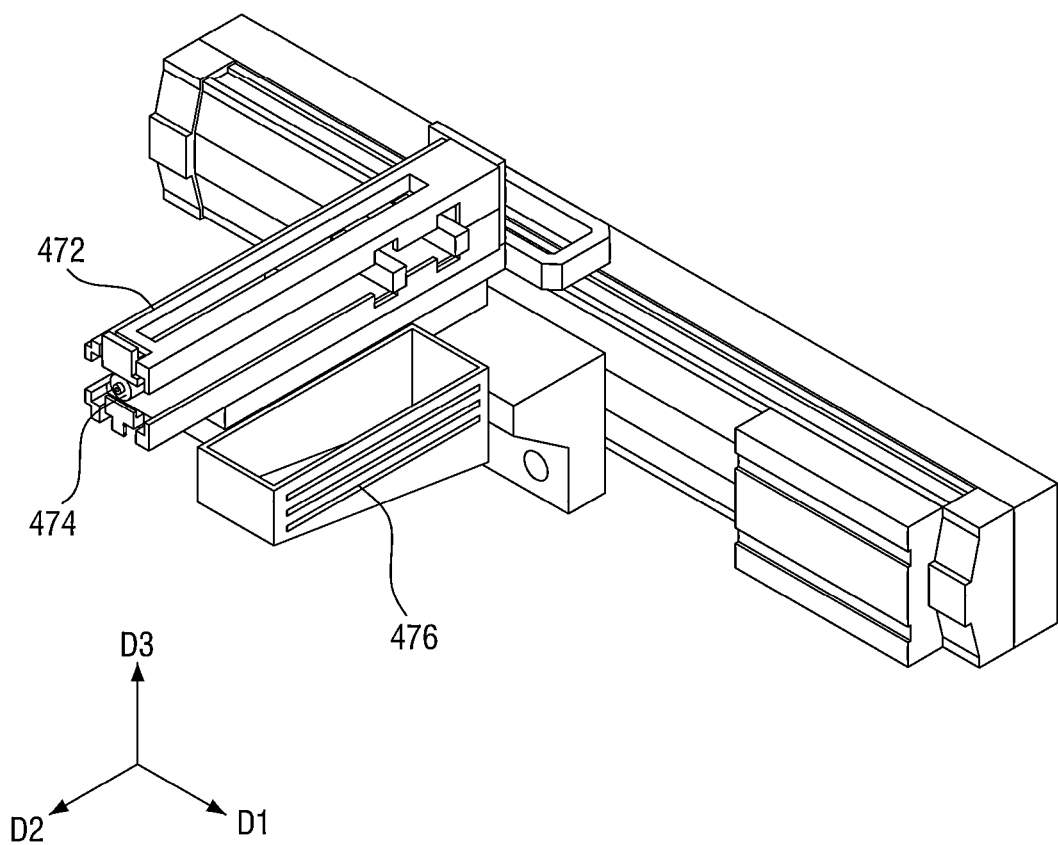
FIG. 17 is a view for describing a gasket supply device of FIG. 9.

FIG. 17 is a view for describing a gasket supply device of FIG. 9.

Referring to FIGS. 1, 2, and 9 to 17, a gasket supply device 470 may include a gasket supply unit 472, a gasket 474, and a gasket box 476.

The gasket supply unit 472 may be disposed on a side surface of the gas cabinet 410. The gasket supply unit 472 may be disposed on one side surface of the gas cabinet 410 in the first direction D1. The gasket supply unit 472 may protrude in the second direction D2. The gasket supply unit 472 may store one or more gaskets 474 therein.

The gasket supply unit 472 may further include an elastic body such as a spring. The gasket supply unit 472 may provide the gasket 474 in the second direction D2 due to the elastic body. The gasket supply unit 472 may be attachable to and detachable from the gas cabinet 410. Therefore, in example embodiments where there are no more gaskets 474 left in the gasket supply unit 472, the gasket supply unit 472 may be detached from the gas cabinet 410 and filled with the gaskets 474 and then attached to the gas cabinet 410 again.

The gasket box 476 may be disposed at a side surface of the gasket supply unit 472. The gasket box 476 may store used gaskets 474. The gasket box 476 may also be attachable to and detachable from the gas cabinet 410.

Meanwhile, referring to FIGS. 11 and 12, the common fastening device 440 may further include a gasket moving unit 444 and a gasket gripper 446.

The gasket moving unit 444 may be disposed at a side surface of the common fastening device 440. The gasket gripper 446 may be connected to the gasket moving unit 444. The gasket moving unit 444 may move to the gasket supply device 470 and the fastening unit 450 according to movement of the common fastening device 440.

The gasket gripper 446 may grip the gasket 474 and may rotate on a plane formed by the first direction D1 and the third direction D3. The gasket gripper 446 may grip the gasket 474 and provide the gasket 474 to the CGA holder unit 452. The gasket gripper 446 may grip the gasket 474 coupled to the CGA holder unit 452 to remove the gasket 474 from the CGA holder unit 452. The removed gasket 474 may be stored in the gasket box 476. The gasket gripper 446 may receive power by an actuator such as a pneumatic actuator, a stepper motor, or a servo motor.

When the gas spray nozzle 24 is coupled to the CGA holder unit 452, the gasket 474 may be disposed between the CGA holder unit 452 and the gas spray nozzle 24. For example, the gasket 474 may reduce or prevent the leakage of a gas provided from the gas spray nozzle 24 to the CGA holder unit 452.

Therefore, due to control of the controller 600, the gasket 474 may be automatically provided to the CGA holder unit 452 or automatically separated from the CGA holder unit 452.

Figure 18:
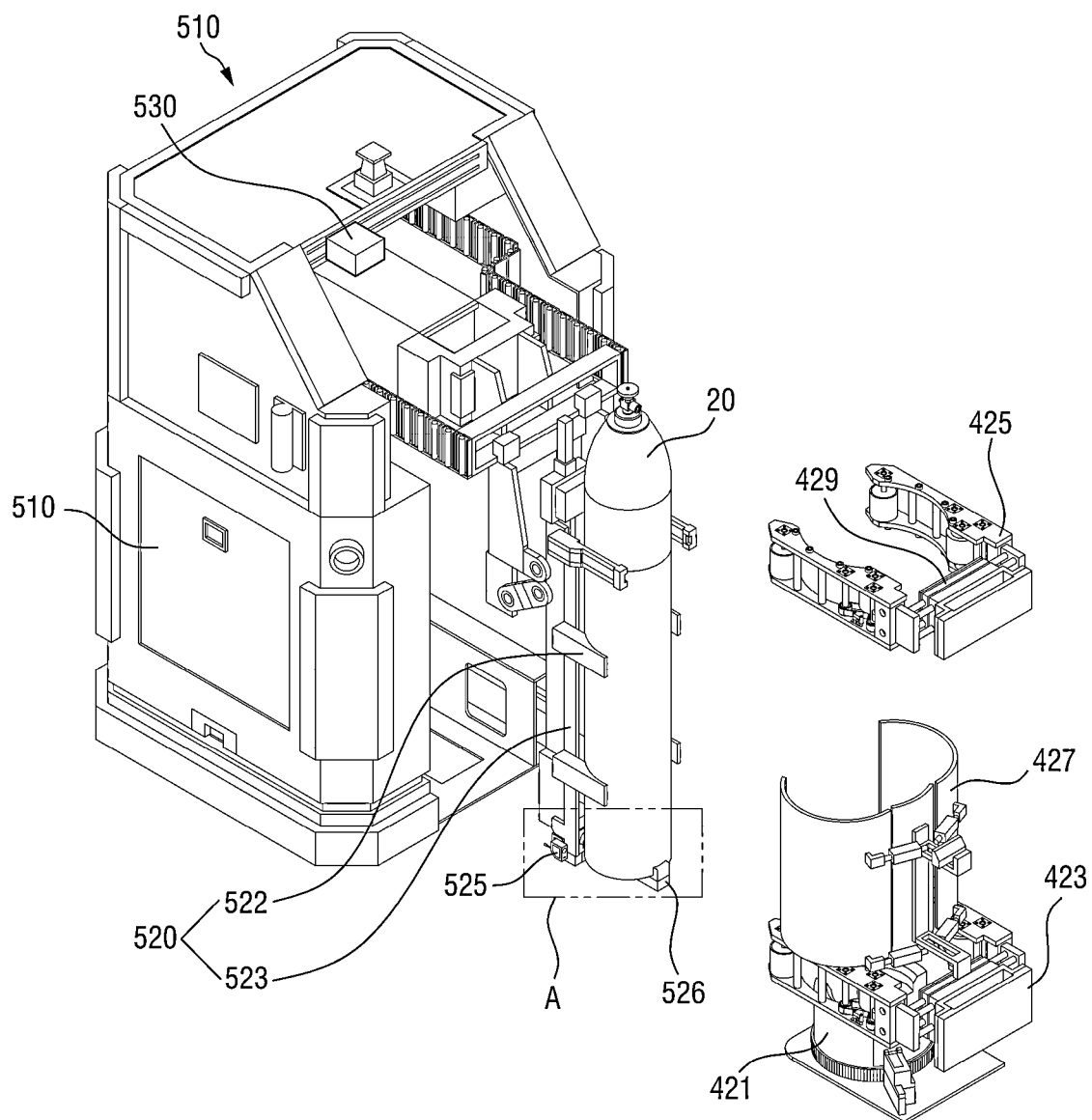
FIG. 18 is a view for describing a mobile robot and a gas cabinet of FIGS. 1 and 2.
Figure 19:
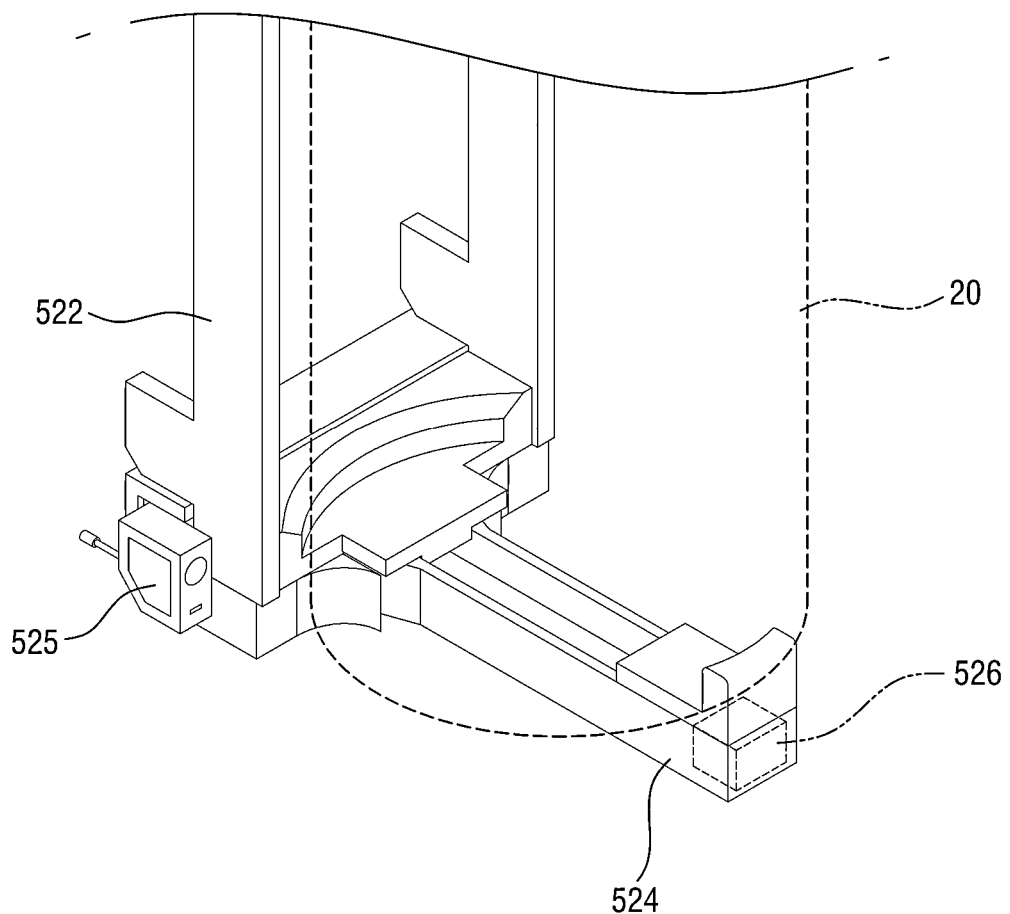
FIG. 19 is an enlarged view of portion A of FIG. 18.
Figure 20:
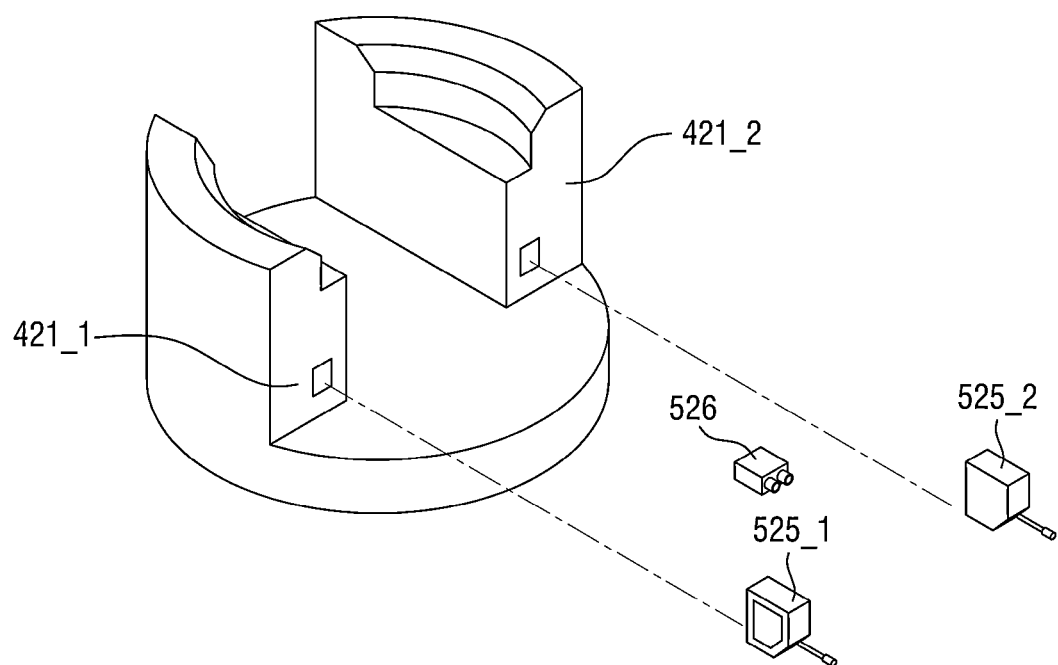
FIG. 20 is a view for describing a second seating unit of FIG. 9.

FIG. 18 is a view for describing the mobile robot and the gas cabinet of FIGS. 1 and 2. In FIG. 18, only some elements of the gas cabinet are illustrated. FIG. 19 is an enlarged view of portion A of FIG. 18. FIG. 20 is a view for describing the second seating unit of FIG. 9.

Referring to FIGS. 1, 2, and 9 to 20, the mobile robot 500 may include a body unit 510, an arm unit 520, and a second loading detection sensor 530.

The arm unit 520 may be disposed at one surface of the body unit 510. The arm unit 520 may include a third gripper 522, a driving unit 523, and a third seating unit 524. The driving unit 523 may connect the body unit 510 and the third gripper 522. One end of the driving unit 523 may be connected to the body unit 510, and the other end of the driving unit 523 may be connected to the third gripper 522.

The third gripper 522 may surround a side surface of the gas cylinder 20. The gas cylinder 20 may be fixed to the mobile robot 500 by the third gripper 522.

The driving unit 523 may move in the first, second, and third directions D1, D2, and D3. The gas cylinder 20 fixed to the third gripper 522 may be moved in the first, second, and third directions D1, D2, and D3 by the driving unit 523.

A first distance measurement sensor 525 may be disposed on both side surfaces of the driving unit 523. A first-first distance measurement sensor 525_1 may be disposed on one side surface of the driving unit 523, and a first-second distance measurement sensor 525_2 may be disposed on a surface that faces the first-first distance measurement sensor 525_1.

The first distance measurement sensor 525 may use a laser to detect a first surface 421_2 of the second seating unit 421 that faces the first distance measurement sensor 525. On the basis of the first surface 421_2 of the second seating unit 421 that is detected by the first distance measurement sensor 525, the controller 600 may recognize a distance from the mobile robot 500 to the second seating unit 421. Also, on the basis of the first surface 421_2 of the second seating unit 421 that is detected by the first distance measurement sensor 525, the controller 600 may detect a slope difference between the mobile robot 500 and the second seating unit 421. That is, the controller 600 may detect an angle at which the second seating unit 421 is tilted with respect to the mobile robot 500. The first distance measurement sensor 525 may be, for example, a laser distance sensor (LDS).

Therefore, due to control of the controller 600, the mobile robot 500 may be aligned with the second seating unit 421.

The third seating unit 524 may be disposed at the bottom of the driving unit 523. The third seating unit 524 may protrude in the first direction D1 from the center of the driving unit 523. The gas cylinder 20 may be seated on the third seating unit 524.

The third seating unit 524 may further include a second distance measurement sensor 526. The second distance measurement sensor 526 may be disposed on the third seating unit 524. The second distance measurement sensor 526 may detect the first surface 421_2 of the second seating unit 421 that faces the second distance measurement sensor 526. The second distance measurement sensor 526 may detect a quick response (QR) mark disposed on the first surface 421_2. The second distance measurement sensor 526 may be, for example, a QR code reader. On the basis of the QR mark detected by the second distance measurement sensor 526, the controller 600 may detect a position difference between the mobile robot 500 and the second seating unit 421 and/or angles at which the mobile robot 500 and the second seating unit 421 are tilted.

Therefore, due to control of the controller 600, the mobile robot 500 may be aligned with the second seating unit 421. The mobile robot 500 may be aligned with the gas cabinet 410 by the first distance measurement sensor 525 and/or the second distance measurement sensor 526. Although the mobile robot 500 is illustrated in the drawings as including the first distance measurement sensor 525 and the second distance measurement sensor 526, the present disclosure is not limited thereto. That is, the mobile robot 500 may only include at least one of the first distance measurement sensor 525 and the second distance measurement sensor 526.

In the mobile robot 500 according to some example embodiments of the present disclosure, since the first and second distance measurement sensors 525 and 526 are included in the arm unit 520, in example embodiments where the arm unit 520 is loaded with the gas cylinder 20 and the position of the arm unit 520 is misaligned due to the weight of the gas cylinder 20, the positions of the first and second distance measurement sensors 525 and 526 may also be misaligned. Therefore, the controller 600 may more accurately correct and control the alignment between the mobile robot 500 and the second seating unit 421.

The second loading detection sensor 530 may be disposed on the body unit 510. The second loading detection sensor 530 may be disposed on an upper portion of one surface of the body unit 510 at which the arm unit 520 is disposed. The second loading detection sensor 530 may detect whether the gas cylinder 20 is loaded on the second seating unit 421 in the gas cabinet 410 that faces the second loading detection sensor 530.

The second seating unit 421, the lower clamp module 423, and the upper clamp module 425 may be disposed in the gas cabinet 410. A first loading detection sensor 429 may be disposed on the upper clamp module 425. The first loading detection sensor 429 may detect whether the gas cylinder 20 is loaded on the second seating unit 421. Although the first loading detection sensor 429 is illustrated in the drawings as being disposed on the upper clamp module 425, the present disclosure is not limited thereto. For example, the first loading detection sensor 429 may be disposed on the second seating unit 421 or the lower clamp module 423 to detect whether the gas cylinder 20 is loaded.

The first loading detection sensor 429 may detect whether the gas cylinder 20 is loaded on the second seating unit 421. On the basis of a result of detection by the first loading detection sensor 429, the controller 600 may determine that the gas cylinder 20 is not loaded on the second seating unit 421. In example embodiments where the gas cylinder 20 is not loaded on the second seating unit 421, the controller 600 may determine whether the gas cylinder 20 is loaded on the mobile robot 500. This is because the gas cylinder 20 should be provided to the second seating unit 421 on which the gas cylinder 20 is not loaded.

According to control of the controller 600, the mobile robot 500 having the gas cylinder 20 loaded thereon may move to the gas cabinet 410. The mobile robot 500 may move to the second seating unit 421, to which the gas cylinder 20 will be provided, in the gas cabinet 410. The second loading detection sensor 530 disposed in the mobile robot 500 may detect whether the gas cylinder 20 is loaded on the second seating unit 421. On the basis of a result of detection by the second loading detection sensor 530, the controller 600 may further determine that the gas cylinder 20 is not loaded on the second seating unit 421.

The arm unit 520 of the mobile robot 500 may be disposed in front of the second seating unit 421 so as not to collide with other elements in the gas cabinet 410. The second seating unit 421 may include a recessed groove formed in a central portion. The third seating unit 524 of the mobile robot 500 may be seated on the groove formed in the second seating unit 421.

When the arm unit 520 provides the gas cylinder 20 to the gas cabinet 410, the lower clamp module 423 and the upper clamp module 425 may semi-grip the gas cylinder 20. When the lower clamp module 423 and the upper clamp module 425 completely grip the gas cylinder 20, the arm unit 520 of the mobile robot 500 may provide the gas cylinder 20 to the gas cabinet 410.

Figure 21:
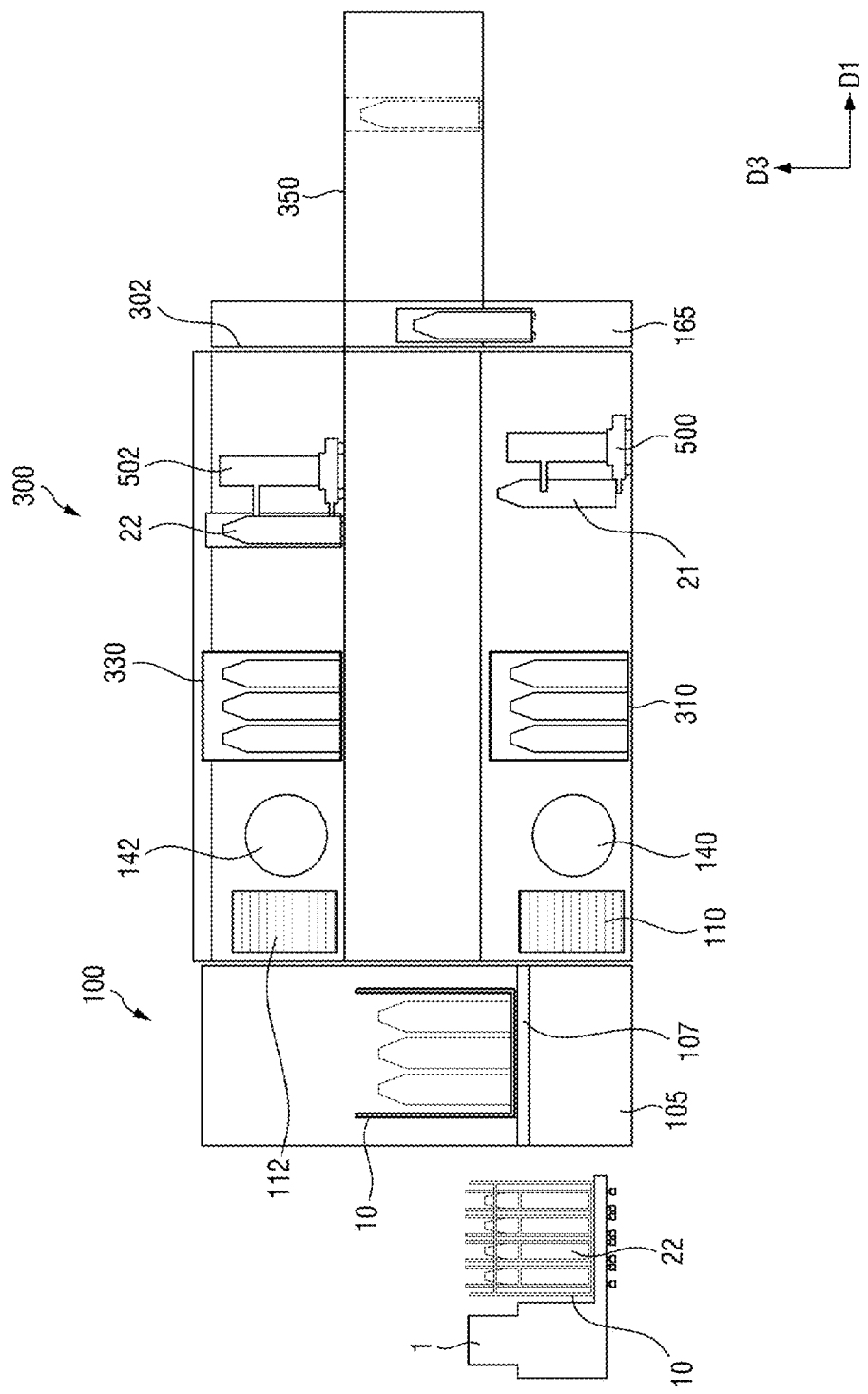
FIG. 21 is a view for describing an automated gas supply system according to some other example embodiments of the present disclosure.

FIG. 21 is a view for describing an automated gas supply system according to some other example embodiments of the present disclosure. Hereinafter, differences from the automated gas supply system of FIGS. 1 and 2 will be mainly described.

The automated gas supply system according to some other example embodiments of the present disclosure may include one or more layers in the third direction D3. The one or more layers may include a first layer 301 and a second layer 302. For example, the second layer 302 may correspond to the top layer in the third direction D3. The first layer 301 may store one or more first gas cylinders 20 each storing a gas other than a combustible gas. The second layer 302 may store one or more second gas cylinders 22 each storing a combustible gas. In the second layer 302, a second transfer unit 115, a third transfer robot 142, a second storage queue 330, and a fourth transfer robot 502 may be disposed.

A cradle 10 having the one or more second gas cylinders 22 stored therein may be provided from a forklift 1. The gas cylinder transfer unit 100 may further include an elevator 105. The cradle 10 may be loaded on a conveyor belt 107 in the elevator 105. The cradle 10 may be moved in the third direction D3 by the elevator 105 and provided to the second layer 302.

The cradle 10 may be provided to the second transfer unit 115 disposed in the second layer 302. The third transfer robot 142 disposed in the second layer 302 may separate the second gas cylinders 22 stored in the cradle 10 in units of second gas cylinders 22. The third transfer robot 142 may be the same transfer robot as the transfer robot 140.

The fourth transfer robot 502 and the second storage queue 330 may be disposed in the second layer 302. The fourth transfer robot 502 may provide the second gas cylinder 22 to the second storage queue 330. Since the second gas cylinder 22 stores a combustible gas therein, the fourth transfer robot 502 may further include an explosion-proof frame 506 (see FIG. 22). Hereinafter, description will be given with reference to FIG. 22.

Meanwhile, the gas cylinder transfer unit 100 may further include a cylinder lifter 165 disposed between the gas cylinder storage unit 300 and a gas cylinder replacement unit. The gas cylinder replacement unit may be disposed in the first layer 301. Therefore, the second gas cylinder 22 may be provided to the gas cylinder replacement unit of the first layer 301 through the cylinder lifter 165. Alternatively, through a connecting path 350, the second gas cylinder 22 may be provided to a gas cylinder replacement unit disposed in another building.

The second gas cylinder 22 stored in the second storage queue 330 may be provided to the gas cylinder replacement unit 400 through the cylinder lifter 165. The cylinder lifter 165 may move the second gas cylinder 22 in the third direction D3. Due to including a combustible gas therein, the second gas cylinder 22 may be loaded in the explosion-proof frame 506 (see FIG. 22) and provided to the cylinder lifter 165.

Figure 22:
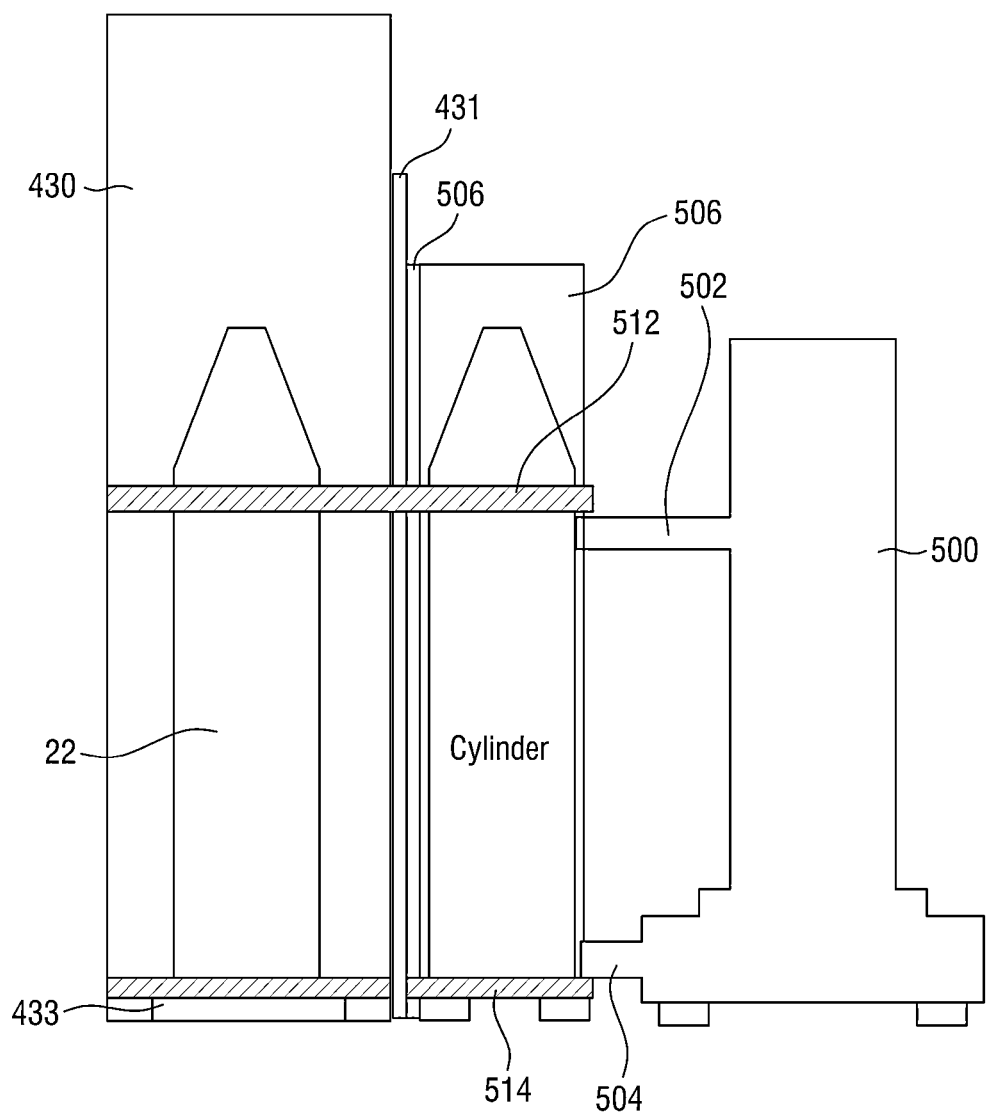
FIG. 22 is a view for describing a gas cabinet of FIG. 21.

FIG. 22 is a view for describing a gas cabinet of FIG. 21.

Referring to FIGS. 21 and 22, the second gas cylinder 22 storing a combustible gas therein may be loaded in the explosion-proof frame 506 and provided to the first layer 301. One side of the explosion-proof frame 506 may be connected to a lower end and the arm unit 520 of the mobile robot 500. The explosion-proof frame 506, in which the second gas cylinder 22 is loaded, may be connected to the mobile robot 500 and transferred to a gas cabinet 410. The mobile robot 500 may move the explosion-proof frame 506 to the front of the gas cabinet 410 and align the position of the explosion-proof frame 506.

A docking unit 516 may be disposed at the other side of the explosion-proof frame 506. The docking unit 516 may be docked with the gas cabinet 410. When the docking unit 516 and the gas cabinet 410 are docked, an entry/exit unit 431 of the gas cabinet 410 may be open.

The explosion-proof frame 506 may include a first telescopic actuator 512 and a second telescopic actuator 514. The first telescopic actuator 512 may be disposed at an upper side of the explosion-proof frame 506. The second telescopic actuator 514 may be disposed at a lower end of the explosion-proof frame 506. When the entry/exit unit 431 of the gas cabinet 410 is open, the first telescopic actuator 512 and the second telescopic actuator 514 may move toward the gas cabinet 410.

The first telescopic actuator 512 may be connected to the gas cabinet 410. The second telescopic actuator 514 may be connected to a loading unit 433 of the gas cabinet 410, and a connecting path may be formed. The second gas cylinder 22 may be moved to the gas cabinet 410 through the connecting path and may be guided by the first telescopic actuator 512 so as not to fall. Therefore, the second gas cylinder 22 storing a combustible gas therein may be safely and automatically replaced. Also, due to the explosion-proof frame 506, damage from gas leaks from the second gas cylinder 22 or explosion thereof may be reduced.

Figure 23:
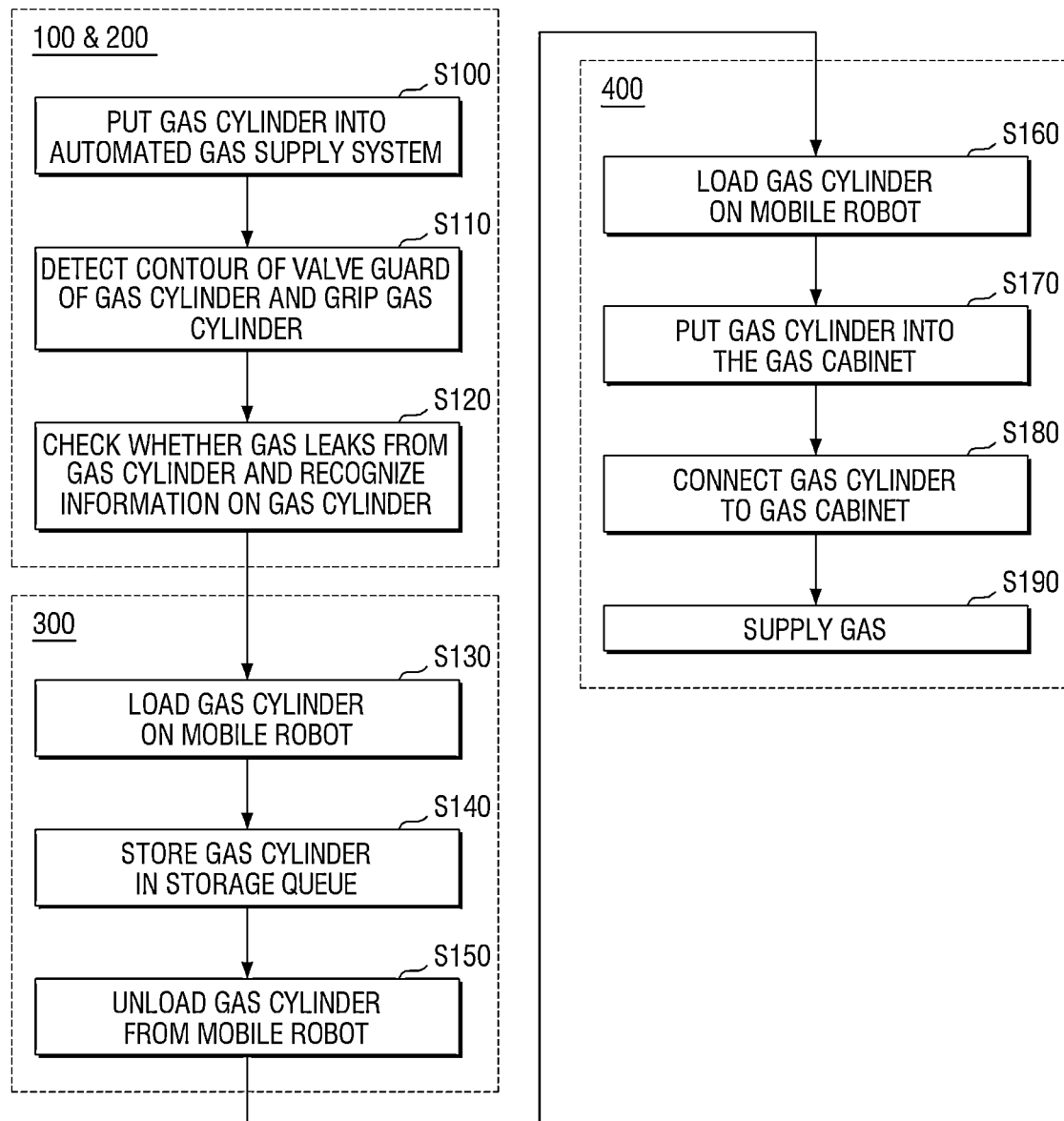
FIG. 23 is a flowchart for describing the automated gas supply system according to some example embodiments of the present disclosure.

FIG. 23 is a flowchart for describing the automated gas supply system according to some example embodiments of the present disclosure.

Referring to FIGS. 1 to 23, in the automated gas supply system according to some example embodiments of the present disclosure, the gas cylinder 20 may be put into the automated gas supply system (S100). The gas cylinder 20 may be transferred to the gas cylinder inspection unit 200 by the gas cylinder transfer unit 100.

Then, the gas cylinder inspection unit 200 may check the shape of a valve of the gas cylinder 20 and grip a side surface of the gas cylinder (S110). The gas cylinder inspection unit 200 may read information on the gas cylinder 20 through the barcode 21 attached to the outside of the gas cylinder 20. Also, the gas cylinder inspection unit 200 may check whether the gas leaks from the gas cylinder 20 (S120).

Then, the gas cylinder 20 whose checking is completed by the gas cylinder inspection unit 200 may be loaded on the mobile robot 500 (S130). The mobile robot 500 may transfer the gas cylinder 20 to the storage queue 310. The gas cylinder 20 may be stored in the storage queue 310 (S140), and then the gas cylinder 20 may be unloaded from the mobile robot 500 (S150).

In example embodiments where the gas in the gas cylinder 20 loaded in the gas cabinet 410 is exhausted, the gas cylinder 20 stored in the storage queue 310 may be loaded on the mobile robot 500 (S160). The mobile robot 500 may put a gas cylinder 20 into the gas cabinet 410 (S170). The gas cylinder 20 may be connected to the gas cabinet 410 by the common fastening device 440 (S180). A valve shutter 443 of the gas cylinder 20 may be connected (S190).

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Embodiments of the present disclosure have been described above with reference to the accompanying drawings, but the present disclosure is not limited to the above example embodiments and may be implemented in other various forms. Those of ordinary skill in the art to which the present disclosure pertains should understand that the present disclosure may be embodied in other specific forms without changing the technical idea or essential features of the present disclosure. Therefore, the example embodiments described above should be understood as illustrative, instead of limiting, in all aspects.

What is claimed is:

1. A method of operating an automated gas supply system, the method comprising:
   receiving a cradle in which one or more gas cylinders storing a gas therein are stored, the cradle being received at a gas cylinder transfer unit;
   transferring a gas cylinder among the one or more gas cylinders in the cradle from the gas cylinder transfer unit to a gas cylinder inspection unit, by a mobile robot;
   checking properties of a gas stored in the gas cylinder in the gas cylinder inspection unit and whether the gas leaks from the gas cylinder in the gas cylinder inspection unit;
   transferring the gas cylinder from the gas cylinder inspection unit to a gas cylinder storage unit, by the mobile robot;
   transferring the gas cylinder from the gas cylinder storage unit to a gas cylinder replacement unit, by the mobile robot; and
   connecting a gas nozzle of the gas cylinder to a gas pipe, which is connected to a semiconductor manufacturing process line in the gas cylinder replacement unit, to supply the gas stored in the gas cylinder to the semiconductor manufacturing process line.

2. The method of operating the automated gas supply system of claim 1, further comprising:
   checking a shape of a valve of the gas cylinder in the gas cylinder inspection unit.

3. The method of operating the automated gas supply system of claim 1, wherein the checking properties of a gas in the gas cylinder in the gas cylinder inspection unit comprises:
   recognizing a barcode attached to the gas cylinder in the gas cylinder inspection unit.

4. The method of operating the automated gas supply system of claim 1, wherein the transferring the gas cylinder, the checking properties of gas stored in the gas cylinder and whether the gas leaks from the gas cylinder, and the transferring the gas cylinder from the gas cylinder inspection unit to the gas cylinder storage unit are repeated by selecting a different one of the one or more gas cylinders.

5. The method of operating the automated gas supply system of claim 4, further comprising:
   detecting a residual amount of a gas stored in the gas cylinder with the gas nozzle connected to the gas pipe.

6. The method of operating the automated gas supply system of claim 5, further comprising:
   when the detected residual amount of the gas stored in the gas cylinder is less than or equal to a set residual amount of gas, recovering the gas cylinder from inside the gas cylinder replacement unit and transferring the gas cylinder from the gas cylinder storage unit to the gas cylinder replacement unit, by the mobile robot.

7. The method of operating the automated gas supply system of claim 1, wherein the connecting a gas nozzle of the gas cylinder to a gas pipe comprises:

detecting a position of the gas nozzle of the gas cylinder in the gas cylinder replacement unit; and compensating for a degree at which the gas cylinder is tilted, on a basis of the position of the gas nozzle of the gas cylinder, and then connecting the gas nozzle of the gas cylinder to the gas pipe.

8. The method of operating the automated gas supply system of claim 1, wherein the connecting a gas nozzle of the gas cylinder to a gas pipe comprises:

detecting an alignment mark formed on an upper surface of a fastening unit, which is disposed on a sidewall of a gas cabinet, which is stored the gas cylinders transferred from the gas cylinder inspection unit, at a side surface of the gas nozzle of the gas cylinder; and moving a common fastening device to be aligned with the fastening unit to couple to the fastening unit, on the basis of the detected alignment mark, and then connecting the gas nozzle of the gas cylinder to the gas pipe.

9. The method of operating the automated gas supply system of claim 1, further comprising:

providing a gasket between the gas nozzle of the gas cylinder and the gas pipe.

10. The method of operating the automated gas supply system of claim 1, further comprising:

recognizing a quick response (QR) code disposed on a seating unit in the gas cylinder replacement unit to detect a distance between the seating unit and the mobile robot, by the mobile robot; and seating the gas cylinder transferred from the gas cylinder storage unit on the seating unit on a basis of the detected distance, by the mobile robot.

11. The method of operating the automated gas supply system of claim 1, wherein the transferring the gas cylinder from the gas cylinder inspection unit to the gas cylinder storage unit comprises:

detecting whether a gas cylinder is loaded on a seating unit in the gas cylinder replacement unit, by using a loading detection sensor disposed on the seating unit; and when the gas cylinder is not loaded on the seating unit, loading the gas cylinder from the gas cylinder storage unit on the seating unit to transfer the gas cylinder from the gas cylinder storage unit to the gas cylinder replacement unit, by the mobile robot.

12. The method of operating the automated gas supply system of claim 1, wherein the transferring the gas cylinder from the gas cylinder inspection unit to the gas cylinder storage unit comprises:

detecting whether a gas cylinder is loaded on a seating unit in the gas cylinder replacement unit by using a loading detection sensor disposed on the mobile robot, and when the gas cylinder is not loaded on the seating unit, loading the gas cylinder from the gas cylinder storage unit on the seating unit to transfer the gas cylinder from the gas cylinder storage unit to the gas cylinder replacement unit, by the mobile robot.

13. The method of operating the automated gas supply system of claim 1, further comprising:

determining whether the properties of the gas stored in the gas cylinder checked in the gas cylinder inspection unit match the properties of the gas stored in the gas cylinder from the gas cylinder transfer unit.

14. The method of operating the automated gas supply system of claim 1, further comprising:

determining whether the checked properties of the gas stored in the gas cylinder in the gas cylinder inspection unit match the properties of the gas stored in the gas cylinder from the gas cylinder transfer unit.

15. The method of operating the automated gas supply system of claim 1, further comprising:

determining a stock of gas cylinders in the automated gas supply system based on the checked properties of the gas stored in the gas cylinder in the gas cylinder inspection unit.

16. The method of operating the automated gas supply system of claim 1, further comprising:

heating the gas cylinder with the gas nozzle connected to the gas pipe.

17. A method of operating an automated gas supply system, the method comprising:

receiving a cradle in which one or more gas cylinder storing a gas therein are stored, the cradle being received at a gas cylinder transfer unit;

transferring a gas cylinder among the one or more gas cylinders in the cradle from the gas cylinder transfer unit to a gas cylinder inspection unit, by a mobile robot;

checking properties of a gas stored in the gas cylinder in the gas cylinder inspection unit;

identifying an outer shape of the gas cylinder transferred to the gas cylinder inspection unit, and recognizing a barcode attached to an outside the gas cylinder transferred to the gas cylinder inspection unit, by rotating the gas cylinder;

transferring the gas cylinder from the gas cylinder inspection unit to a gas cylinder storage unit, by the mobile robot; and transferring the gas cylinder from the gas cylinder storage unit to a gas cylinder replacement unit, by the mobile robot.

18. The method of claim 17, further comprising:

detecting a residual amount of a gas stored in a gas cylinder connected to a gas pipe, which is connected to a semiconductor manufacturing process line in the gas cylinder replacement unit, to supply the gas stored in the gas cylinder to the semiconductor manufacturing process line; and when the residual amount of the gas stored in the gas cylinder connected to the gas pipe is less than or equal to a set residual amount of gas, recovering the gas cylinder from the cylinder replacement unit, by the mobile robot, and transferring the gas cylinder among one or more gas cylinders stored in the gas cylinder storage unit from the gas cylinder storage unit to the gas cylinder replacement unit, by the mobile robot.

19. The method of operating the automated gas supply system of claim 18, wherein the transferring the gas cylinder from the gas cylinder storage unit to the gas cylinder replacement unit comprises:

transferring the gas cylinder from the gas cylinder storage unit to the gas cylinder replacement unit according to properties of the gas stored in the recovered gas cylinder.

20. The method of operating the automated gas supply system of claim 18, further comprising:

detecting a position of a gas nozzle of the transferred gas cylinder in the gas cylinder replacement unit; and compensating for a degree at which the gas cylinder is tilted, on a basis of the position of the gas nozzle of the gas cylinder; and connecting the gas nozzle of the gas cylinder to the gas pipe.

* * * * *